US011619436B2

(12) United States Patent
Lauchnor

(10) Patent No.: US 11,619,436 B2
(45) Date of Patent: Apr. 4, 2023

(54) CONTAINERS AND METHODS AND DEVICES FOR ENHANCING THERMAL ENERGY TRANSFER BETWEEN CONTAINER CONTENTS AND EXTERNAL ENVIRONMENT

(71) Applicant: Blue Quench LLC, Miramar Beach, MN (US)

(72) Inventor: John C. Lauchnor, Miramar Beach, FL (US)

(73) Assignee: Blue Quench LLC, Miramar Beach, FL (US)

(*) Notice: Subject to any disclaimer, the term of this patent is extended or adjusted under 35 U.S.C. 154(b) by 218 days.

(21) Appl. No.: 16/843,577

(22) Filed: Apr. 8, 2020

(65) Prior Publication Data

US 2020/0333068 A1 Oct. 22, 2020

Related U.S. Application Data

(60) Provisional application No. 62/847,128, filed on May 13, 2019, provisional application No. 62/840,208, filed on Apr. 29, 2019, provisional application No. 62/831,188, filed on Apr. 8, 2019.

(51) Int. Cl.
| | | |
|---|---|---|
| *F25D 31/00* | (2006.01) | |
| *F25D 17/02* | (2006.01) | |
| *A47J 43/27* | (2006.01) | |
| *F25D 25/00* | (2006.01) | |
| *F25D 3/04* | (2006.01) | |

(52) U.S. Cl.
CPC .............. *F25D 17/02* (2013.01); *A47J 43/27* (2013.01); *F25D 3/045* (2013.01); *F25D 25/005* (2013.01); *F25D 31/007* (2013.01); *F25D 2331/805* (2013.01); *F25D 2400/28* (2013.01)

(58) Field of Classification Search
CPC ........ F25D 3/045; F25D 17/02; F25D 25/005; F25D 31/007; F25D 2331/085; F25D 2400/28
See application file for complete search history.

(56) References Cited

U.S. PATENT DOCUMENTS

| | | |
|---|---|---|
| 2,470,551 A | 5/1949 | Fish |
| 3,357,200 A | 12/1967 | Connors |
| 3,888,092 A | 6/1975 | Fisher |
| 4,358,932 A | 11/1982 | Helfrich, Jr. |
| 4,725,492 A | 2/1988 | Yazaki et al. |
| 4,920,763 A | 5/1990 | Provest et al. |

(Continued)

FOREIGN PATENT DOCUMENTS

| | | |
|---|---|---|
| EP | 174170 | 3/1986 |
| JP | 2002168546 | 6/2002 |

(Continued)

OTHER PUBLICATIONS

Federal Institute of Industrial Property, ISA/RU International Search Report dated Oct. 12, 2017, for related PCT Patent Application No. US/2017/037446.

*Primary Examiner* — Jonathan Bradford
(74) *Attorney, Agent, or Firm* — Winthrop & Weinstine, P.A.

(57) ABSTRACT

The disclosure features various embodiments and aspects of containers and related systems for quenching contents of the containers.

20 Claims, 28 Drawing Sheets

(56) References Cited

U.S. PATENT DOCUMENTS

| | | |
|---|---|---|
| 5,237,835 A | 8/1993 | Brochier |
| 5,265,440 A | 11/1993 | Baker |
| 5,423,191 A | 6/1995 | Bennett |
| 5,442,932 A | 8/1995 | O'Hearne |
| 5,466,229 A | 11/1995 | Elson et al. |
| 5,584,187 A | 12/1996 | Whaley |
| 6,039,202 A | 3/2000 | Olstad et al. |
| 6,050,663 A | 4/2000 | Schoellmann |
| 6,058,718 A | 5/2000 | Forsberg et al. |
| 7,165,415 B2 | 1/2007 | Nam et al. |
| 7,246,784 B1 | 7/2007 | Lopez |
| 7,654,097 B2 | 2/2010 | Hawkes |
| 7,669,429 B2 | 3/2010 | Bassler, Sr. |
| 7,703,301 B2 | 4/2010 | Loibl et al. |
| 7,780,034 B1 | 8/2010 | Richardson |
| 7,886,547 B2 | 2/2011 | Sullivan |
| 8,157,338 B2 | 4/2012 | Seo et al. |
| 8,161,769 B2 | 4/2012 | Lauchnor |
| 8,549,871 B1 | 10/2013 | Lauchnor et al. |
| 9,200,831 B2 | 12/2015 | Lauchnor et al. |
| 9,810,473 B2 | 11/2017 | Lauchnor |
| 2006/0016211 A1 | 1/2006 | Lyvers et al. |
| 2006/0219858 A1 | 10/2006 | Lacovino |
| 2008/0156031 A1 | 7/2008 | Cur et al. |
| 2009/0277187 A1 | 11/2009 | McGann |
| 2009/0314011 A1 | 12/2009 | Simmons |
| 2009/0320517 A1 | 12/2009 | Lavallee |
| 2010/0251730 A1 | 10/2010 | Whillock, Sr. |
| 2010/0251755 A1 | 10/2010 | Lauchnor |
| 2012/0060544 A1 | 3/2012 | Lee et al. |
| 2012/0198871 A1 | 8/2012 | Lauchnor et al. |
| 2013/0160987 A1 | 6/2013 | Grigorian |
| 2016/0097577 A1 | 4/2016 | Lauchnor et al. |
| 2017/0010036 A1* | 1/2017 | Lauchnor ............ F25D 27/005 |

FOREIGN PATENT DOCUMENTS

| | | |
|---|---|---|
| WO | 9735155 | 7/2009 |
| WO | 2009090162 | 7/2009 |

* cited by examiner

3100

3100

CONTAINERS AND METHODS AND DEVICES FOR ENHANCING THERMAL ENERGY TRANSFER BETWEEN CONTAINER CONTENTS AND EXTERNAL ENVIRONMENT

CROSS-REFERENCE TO RELATED APPLICATIONS

This patent application claims the benefit of priority to U.S. Provisional Patent Application Ser. No. 62/831,188, filed Apr. 8, 2019, U.S. Provisional Patent Application Ser. No. 62/840208, filed Apr. 29, 2019, and U.S. Provisional Patent Application Ser. No. 62/847,128, filed May 13, 2019.

This patent application is also related to U.S. patent application Ser. No. 15/800,709, filed Nov. 1, 2017 (U.S. Pat. No. 10,174,995), which claims the benefit of priority to and is a continuation of International Application No. PCT/US2017/037446, filed Jun. 14, 2017, which claims the benefit of priority to and is a continuation-in-part of U.S. patent application Ser. No. 15/272,131, filed Sep. 21, 2016 (U.S. Pat. No. 9,810,473), which in turn claims the benefit of priority to U.S. Provisional Patent Application Ser. No. 62/350,062, filed Jun. 14, 2016.

This patent application is related to U.S. patent application Ser. No. 15/800,709, filed Nov. 1, 2017 (U.S. Pat. No. 10,174,995), which claims the benefit of priority to and is a continuation of International Application No. PCT/US2017/037446, filed Jun. 14, 2017, which claims the benefit of priority to and is a continuation-in-part of U.S. patent application Ser. No. 15/272,131, filed Sep. 21, 2016 (U.S. Pat. No. 9,810,473), which in turn is a continuation in part of and claims the benefit of priority to U.S. patent application Ser. No. 14/877,143, filed Oct. 7, 2015 (abandoned), which in turn is a continuation-in-part of U.S. patent application Ser. No. 13/789,679, filed Mar. 8, 2013 (U.S. Pat. No. 9,200,831), which in turn claims the benefit of priority to U.S. Provisional Patent Application Serial No. 61/745,033, filed Dec. 21, 2012.

This patent application is related to U.S. patent application Ser. No. 15/800,709, filed Nov. 1, 2017 (U.S. Pat. No. 10,174,995), which claims the benefit of priority to and is a continuation of International Application No. PCT/US2017/037446, filed Jun. 14, 2017, which claims the benefit of priority to and is a continuation-in-part of U.S. patent application Ser. No. 15/272,131, filed Sep. 21, 2016 (U.S. Pat. No. 9,810,473), which in turn is a continuation in part of and claims the benefit of priority to U.S. patent application Ser. No. 14/877,143, filed Oct. 7, 2015 (abandoned), which Claims Priority from Provisional Application No. 62/060,664, filed Oct. 7, 2014.

The subject matter of this patent application is also related to U.S. Provisional Patent Application Ser. No. 62/840,208, filed Apr. 29, 2019, U.S. Provisional Patent Application Ser. No. 62/831,188, filed Apr. 8, 2019, U.S. patent application Ser. No. 13/854,739, filed Apr. 1, 2013 (U.S. Pat. No. 8,549,871), U.S. Provisional Patent Application Ser. No. 61/798,394, filed Mar. 15, 2013, and U.S. Pat. No. 8,161,769, issued Apr. 24, 2012.

Each and every one of the foregoing patents and patent applications is incorporated by reference herein in its entirety for any purpose whatsoever.

BACKGROUND

Field

The present disclosure relates to a refrigerated chest, portable liquid assisted cooling units and related methods and machine readable programs for the quenching of beverages or other comestible items, particularly the rapid quenching of beverages to a pre-selected temperature and visual or other notification of when beverages are quenched to a certain temperature (i.e., ready to consume). The present disclosure also relates to mobile applications and other implementations for controlling such devices.

Description of Related Art

The use of traditional ice chests for cooling of beverages and maintaining the cooled temperature is well known in the prior art. However, the simple use of ice and water for these purposes has been problematic in that it can take thirty to sixty minutes to cool the beverages and the user has no way of visually determining when the drinks are cooled to the ideal temperature. In short, it has been difficult to determine if the beverages were sufficiently cooled or even over-cooled, and further difficult to maintain the optimum temperature for prolonged periods after the optimum temperature has been achieved. Traditional ice chests have typically not provided the level of elegance and luxury sought by many of today's consumers, particularly those who pride themselves with extravagant outdoor grills and patios.

Moreover, users of ice chests have had to carry their own very heavy ice bags to such chests known in the art and fill those chests with ice. This ice melts to a point where the water becomes warm and turns once cool beverages to warm beverages. The present disclosure provides solutions for this and other problems, as described herein.

SUMMARY OF THE DISCLOSURE

In accordance with aspects of the disclosure, devices are disclosed for thermal management (cooling and/or heating) of beverages in containers that is effectuated by directing a flow of chilled (or warmed) fluid (such as water, brine, or other fluid) over the beverage containers. In some embodiments, the flow of cooling or heating water can cause the beverage containers to rotate in place to enhance heat transfer from the beverage containers to the cooling water, or the containers can be rotated by way of a motorized drive.

In some embodiments, the disclosure provides a modular retrofit device for quenching (or warming, as appropriate) at least one beverage. For cooling, the device includes a quench container adapted and configured to be removably positioned at least partially within a thermally insulated cooler having a cooled water bath. The quench container includes at least one space configured for holding at least one beverage container. The device further can include a pump coupled to and removable with the quench container. Activation of the pump is operative to draw water from the water level of the cooled water bath of the thermally insulated cooler into a quench container and direct the cooled water over the at least one beverage container disposed in the quench container. The pump can be operably coupled to control electronics, and the device can include one or more removable batteries that are preferably rechargeable. The device can include an electric motor drive that is coupled to at least one drive axle for causing at least one beverage container to rotate. The at least one drive axle can include one or more wheels for engaging the at least one beverage container to cause the at least one beverage container to rotate while being cooled with cooling (or heating) water from the bath. The at least one drive axle can include a helical member, as desired, for causing rotation of the at least one beverage that is placed parallel or perpendicular to the at least one drive axle.

The device can further include at least one support (such as one or more downwardly extendable legs) that can be selectively adjusted to alter the overall dimensions of the device to fit thermally insulated coolers of different dimensions. The cooling container can be defined by a generally vertical peripheral wall that can have a sloped base plate. The sloped base plate can have a drain orifice in a lower portion thereof. The quench container can be configured to hold a plurality of beverages. The device can further include at least one level sensor operably coupled to the pump. The device can be configured to shut off the pump in response to an input from the at least one level sensor. The device can include at least one photodetector configured and arranged to be selectively exposed to light originating from outside the thermally insulated cooler, and a controller operably coupled to the pump and to the photodetector, the controller being configured to shut off the pump in response to receiving a signal from the at least one photodetector.

The above advantages and features are of representative embodiments only, and are presented only to assist in understanding the disclosure. It should be understood that these are not to be considered limitations on the disclosure as defined by the claims. Additional features and advantages of embodiments of the disclosure will become apparent in the following description, from the drawings, and from the claims.

DESCRIPTION OF THE DRAWINGS

Further objects and advantages of the disclosure will become apparent from the following description and from the accompanying drawings, wherein.

DETAILED DESCRIPTION OF THE PREFERRED EMBODIMENTS

The present disclosure provides thermal management devices for beverage containers and the like as illustrated in the figures. The systems can be configured to operate in a "closed-loop" mode, wherein an initial volume of water or other working fluid is loaded into the unit. Once the water is loaded, some embodiments of the system (e.g, of FIG. 9) can convert the water to ice, utilize an ice-water bin to cool beverages, and then return the cooling water to be circulated over the beverage containers. When operating in closed-loop mode, the circulating water can be filtered. Similarly, while in closed loop mode, water overflow from the ice-melt in a quench tank can be supplied back into the ice-maker as "water-in" supply fluid. In an open loop mode, water overflow can be drained outside system into existing "p-trap" drain, for example.

Figure 1:
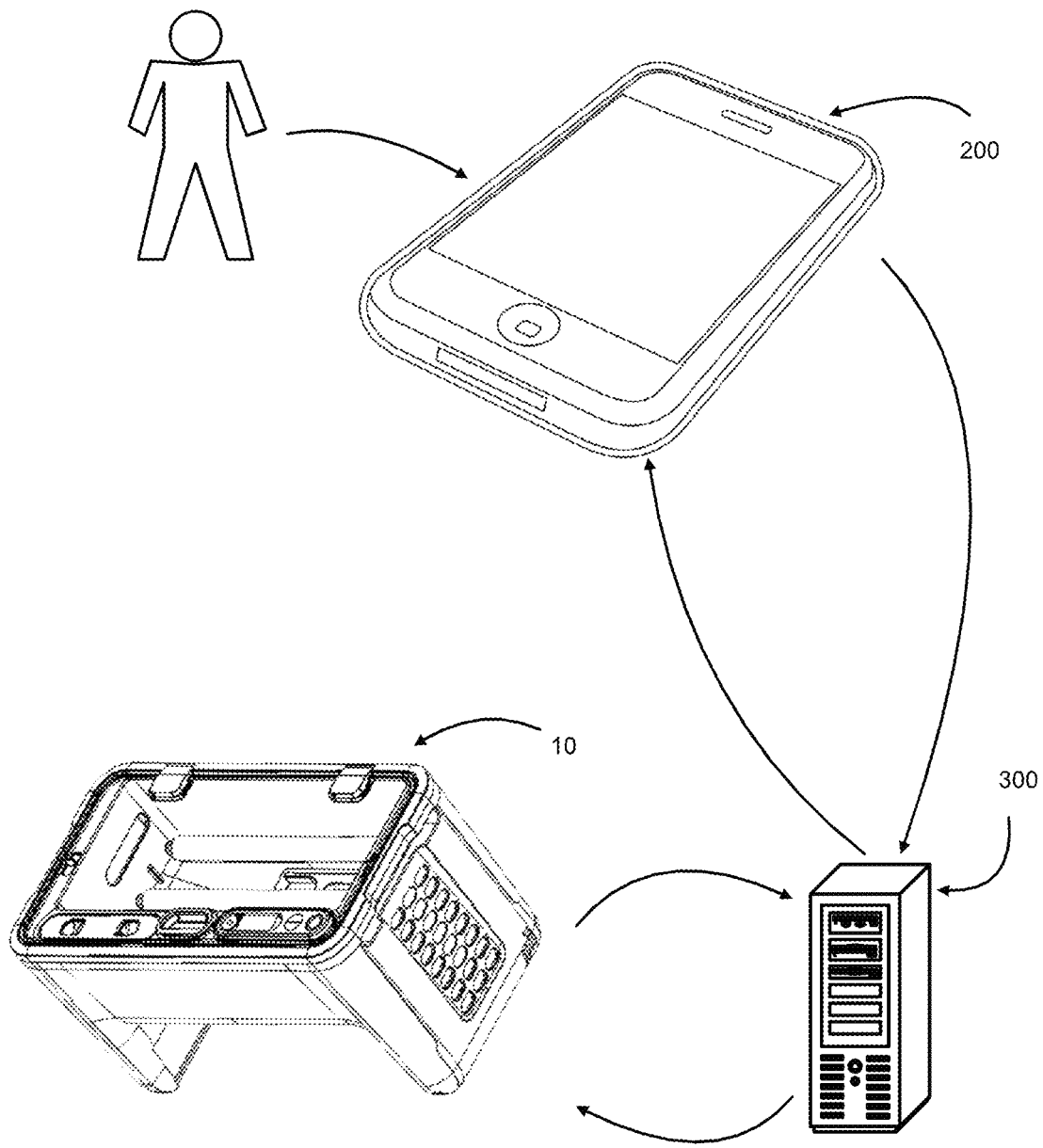
FIG. 1 is a data flow diagram illustrating a system for controlling a thermal management device by way of a remote or mobile device in accordance with the present disclosure.
Figure 2:
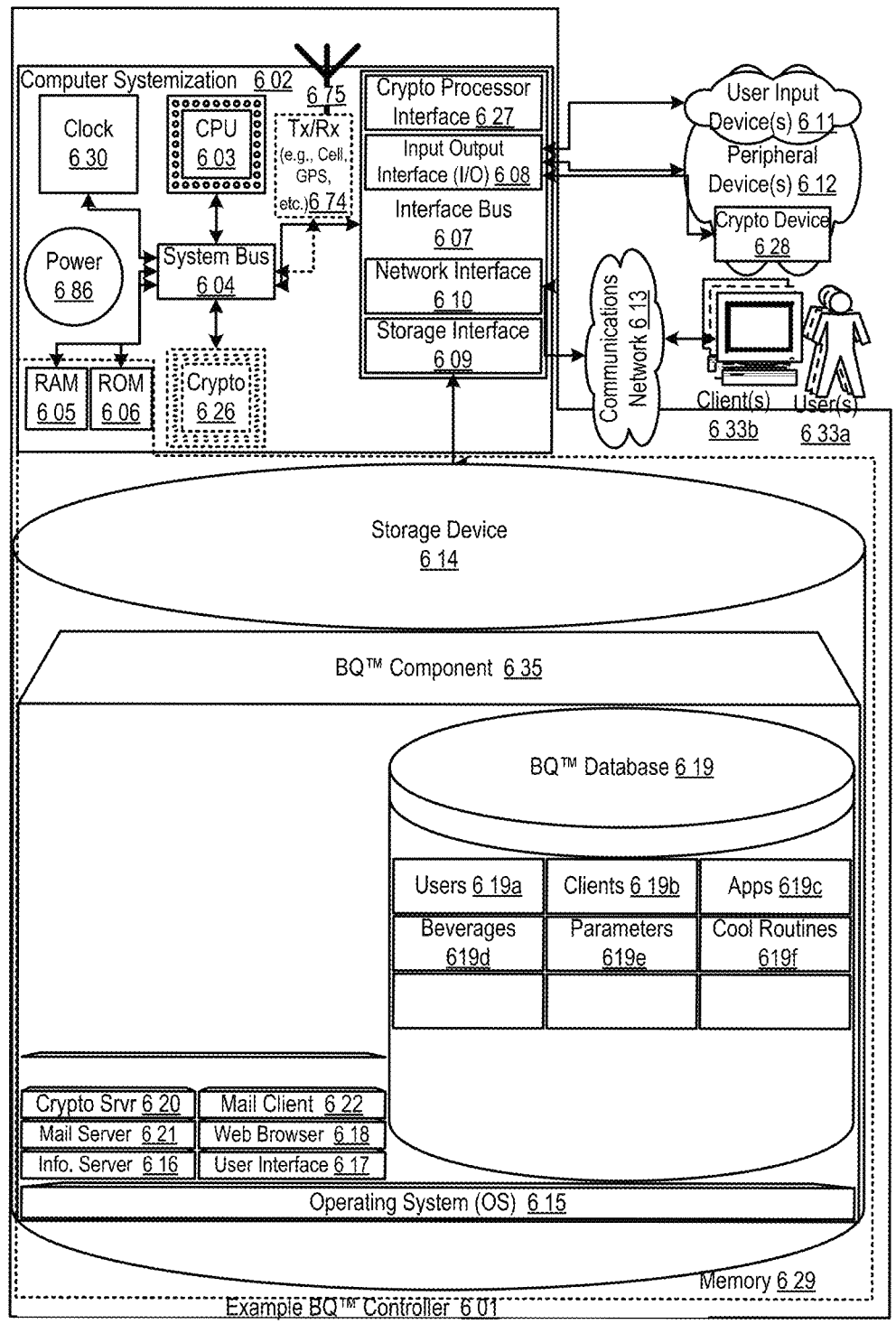
FIG. 2 is a schematic view illustrating aspects of an exemplary system in accordance with the present disclosure.

An illustrative control system is depicted in FIG. 2 that can be used to operate a thermal management device 10 as described herein. If desired, in addition or alternatively, thermal management device 10 can be operated, monitored and controlled remotely via a mobile device 200, such as a smart phone or remote computer terminal via a server 300. Instructions can be input by a user via the remote/mobile device via a server that is in communication with a controller onboard the thermal management device 10 to operate the thermal management device in any desired manner, such as via wireless network and the like, as described below. When a desired cooling temperature is reached, the controller 255 can send a signal via a network to the mobile device 200 indicating that the temperature has been reached. Cooling curves can similarly be graphically represented on the user interface of the mobile device 300 (and/or on control panel 250) as desired. Additionally or alternatively, an operator interface and control console (FIG. 1) including a controller can be provided on the thermal management device 10 if desired, such as via a touch screen operated programmable controller to selectively deliver chilled water to beverage containers in response to various inputs, such as beverage temperature, cooling water temperature, beverage quantity, and desired cooling time.

Figure 5:
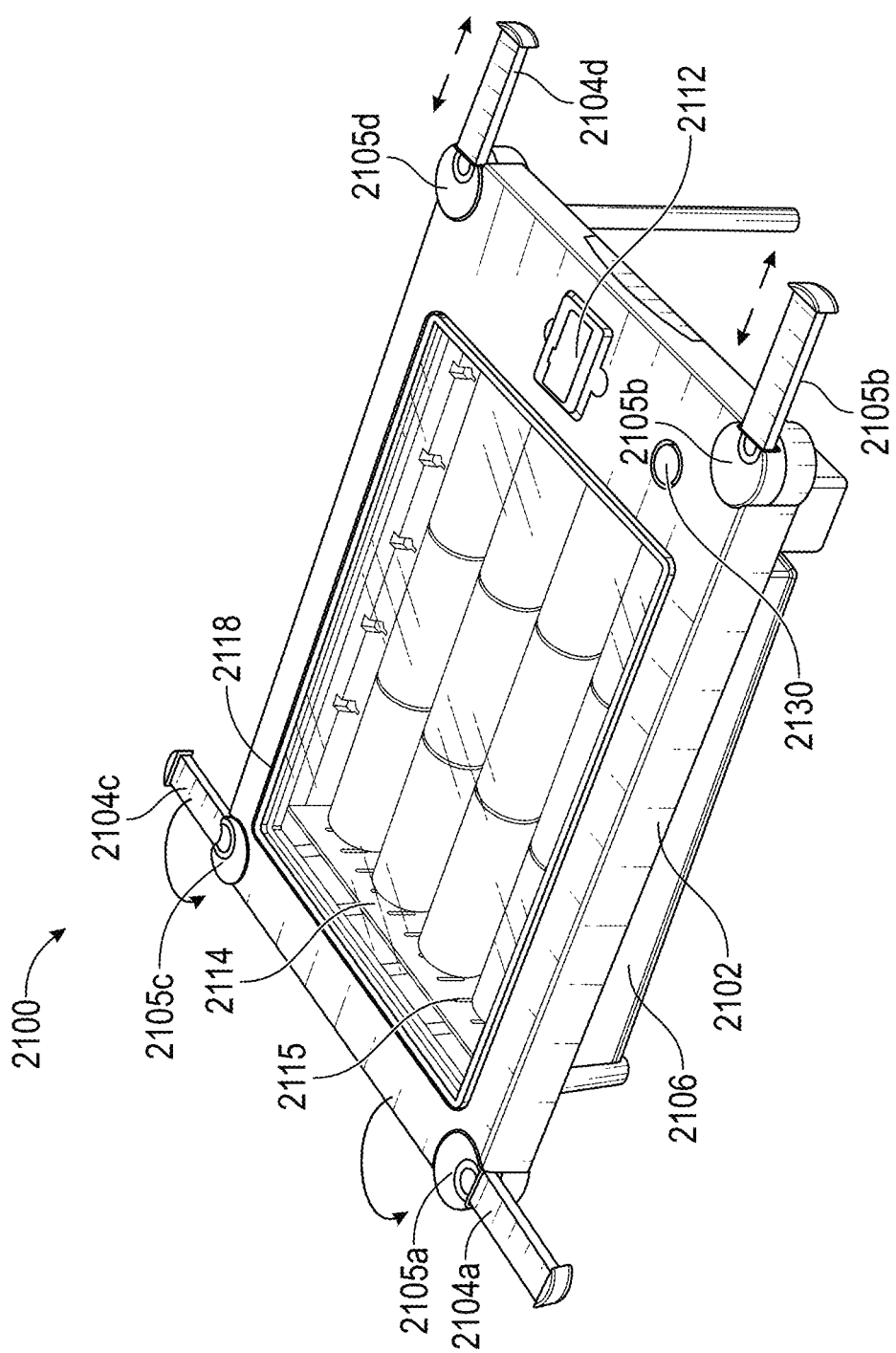
FIG. 5 is an illustration of an exemplary modular retrofit cooling insert in accordance with the disclosure.
Figure 6:
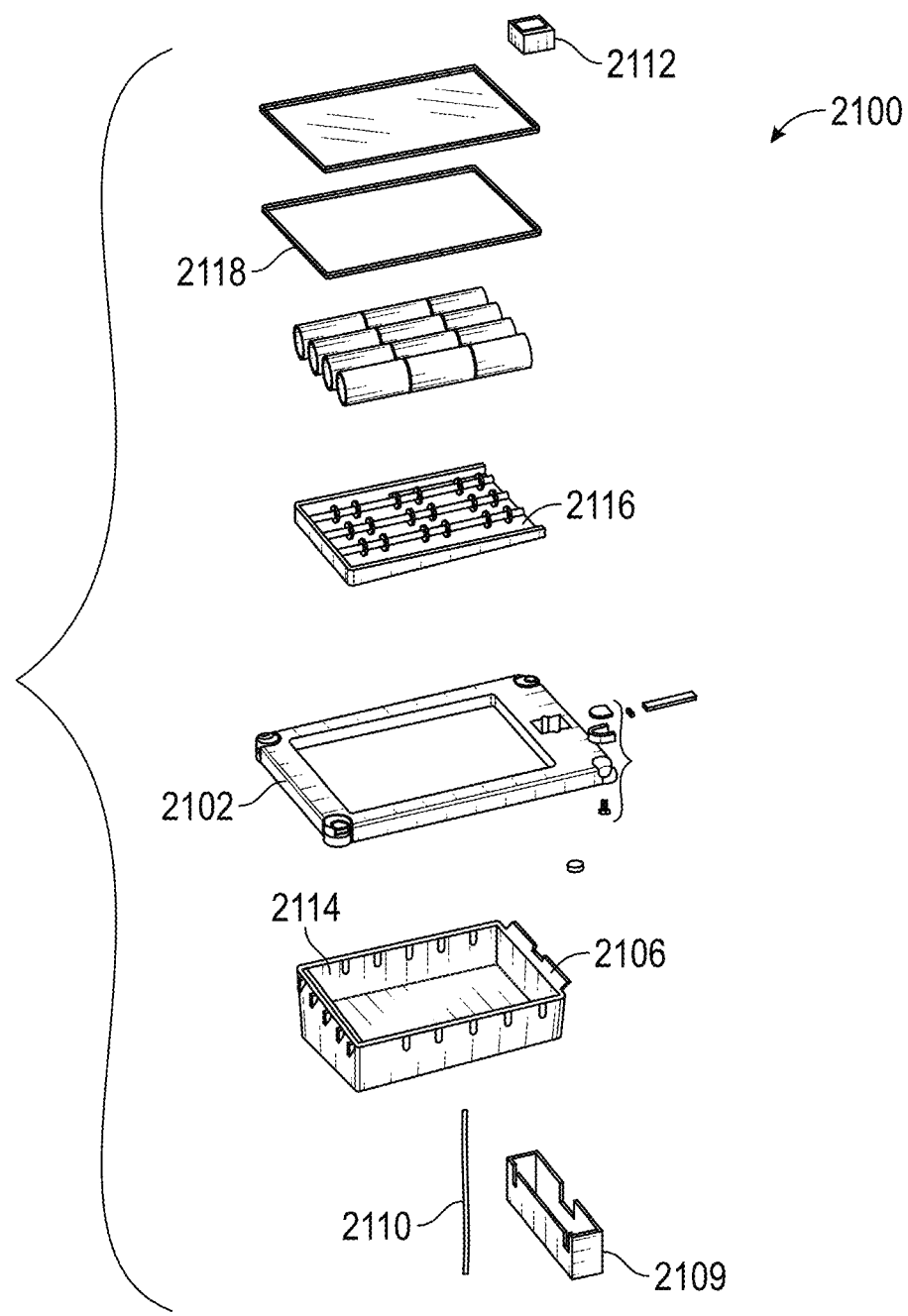
FIG. 6 is an exploded view of the embodiment of FIG. 5.

In other embodiments, a modular quench unit, or insert, that may be fitted or inserted into any adequately sized thermally insulated cooler (e.g., an insulated thermal beverage cooler) is provided. FIG. 5 is a perspective view of an example of a modular quench unit 2100 according to the present invention, and FIG. 6 is an exploded view showing components of the modular quench unit. The quench unit 2100 includes a top platform 2102 having mounting pegs 2104*a,b,c,d* which extended linearly from edge of the platform. As shown, the pegs 2104*a-d* may be coupled to the platform via respective swivel joints 2105*a-d* that enable the pegs to rotate in the plane of the platform 2102. The swivel joints 2105*a-d* enable the quench unit 2100 to be inserted at first and second perpendicular orientations (i.e., 0 and 90 degrees, for example) depending on the cooler size and configuration. Preferably, a cooler is used that has at least a partial internal peripheral lip near the top of the cooler that the legs can rest on top of to support the weight of the modular quench unit 2100 with beverages. If desired, the pegs 2104*a-d* may be linearly extendable and retractable toward and away from the platform 2102, and in some embodiments, may actually retract at least partially into the platform 2102. Taken together, these features of the mounting pegs 2104*a-d* permit the quench unit to be adjustably fitted onto surfaces or features (e.g., lips, supports) of existing coolers. In some embodiments, the mounting pegs 2104*a-d* may be spring loaded and include cleats having a surface made at least in part from a resilient material (e.g., rubber) to enhance grippability and thus to ensure a firm and stable grip between the quench unit 2100 and the cooler. In another embodiment, the mounting pegs may have abrasive surfaces that grip against and/or slightly bite into the wall of the cooler. Accordingly, the mounting pegs 2104*a-d* may hold the quench unit in place even if the cooler is moved, opened or otherwise distrubed. The modular quench unit 2100 can also include one or more control elements and indicators (e.g., buttons, and lights).

It will be appreciated that, while movable pegs 2104 may be used, any desired configuration or accessories can be used to make the unit 2100 adjustable in size. For example, the unit 2100 may have an expandable perimeter frame that can be locked in position that can increase in length and/or width. Similarly, the unit 2100 can be provided in different sizes to accommodate different sized coolers.

Figure 7:
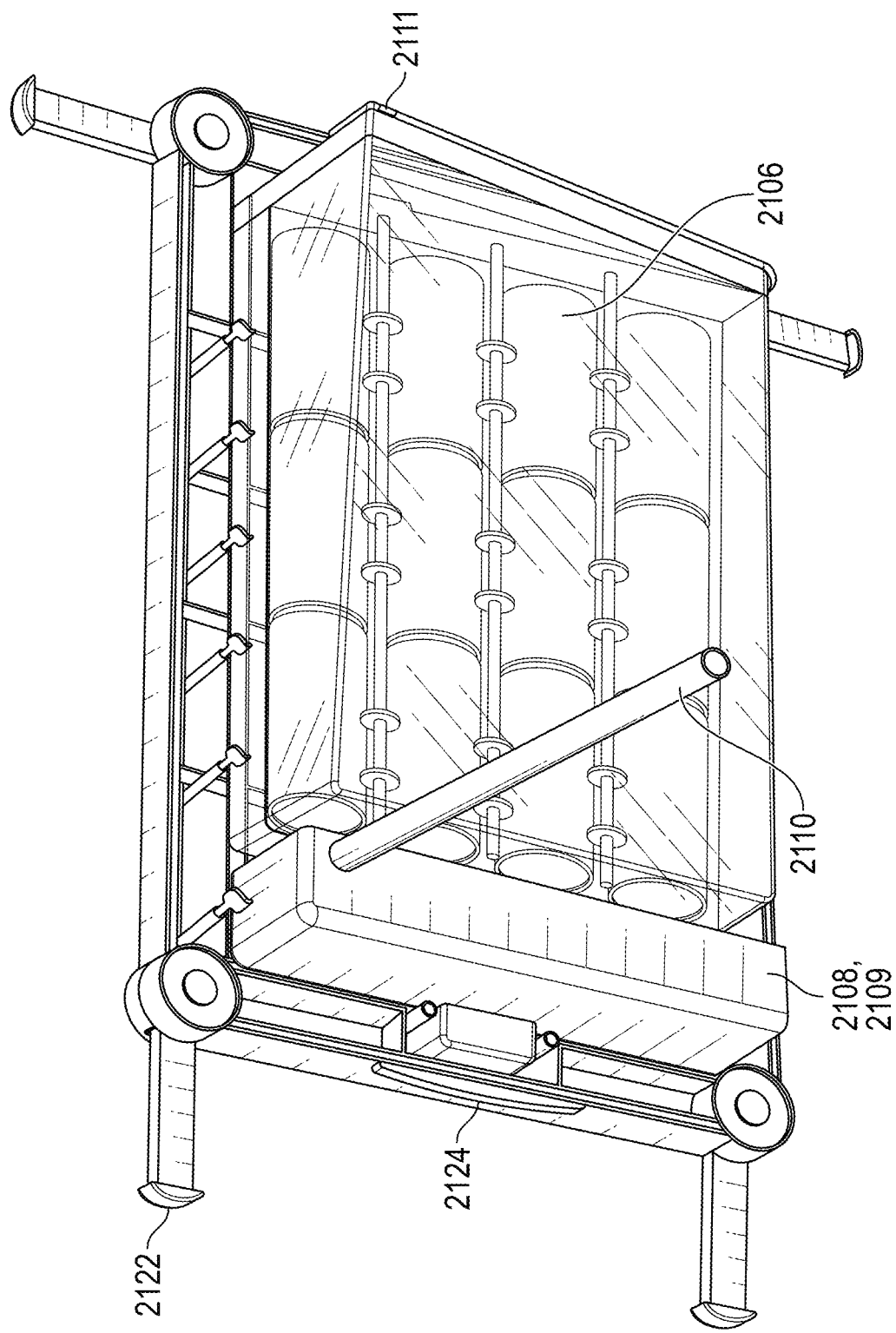
FIG. 7 is an underneath, perspective view of the embodiment of FIG. 5.

Referring to the exploded view of FIG. 6, the modular quench unit 2100 includes a main housing basin 2106 used to hold beverages to be cooled (quenched). In some embodiments, the housing basin is dimensioned so as to hold 12 standard aluminum cans or 8 longneck bottles, but those of skill in the art will appreciate that this can vary. In one embodiment, the length of the basin 2106 can be, for example, approximately 22 inches and the width can be, for example, approximately 14 inches. However, these dimensions are exemplary and should not be viewed as limiting in any way. The quench unit 2100 also includes a pump 2108 and electronics housing 2109 (as shown in FIG. 7 and that may be removable or modular) that is situated adjacent to the basin 2106. The pump 2108 is coupled to and receives cooled water from the cooler in which the retrofit kit is mounted via an inlet hose 2110. The cooler in which the quench unit 2100 is adapted to be fitted may include a cooling (energy) source (e.g., a refrigeration coil) and/or simply an ice-water bath. The modular quench unit 2100 is designed to take advantage of the existing source of cooled water by locating the hose 2110 at or near the bottom of the ice water bath in the cooler and drawing the cooled water through the hose by means of the pump 2108 into the basin 2106 and the beverages contained therein. In some embodiments, the hose 2110 may include a filter or screen to keep out small ice particles and debris and one or more extensions that extend outwardly into the cooling bath to ensure an adequate cooling fluid flow. For example, the filter can be a quick connect/disconnect filter that attaches to an end of the hose 2110. Preferably, the pump, hose and filter can collectively manage a flow rate of up to 10 GPM.

The pump 2108 may produce a flow rate, for example, from 0.25 to about 10 gallons per minute (GPM), or any increment therebetween of about 0.25 GPM, to maximize the beverage cooling rate, although other flow rates may also be used. Power for the pump is preferably provided by a (preferably rechargeable lithium ion) battery 2112 which may be included in the quench unit 2100 within the electronics housing 2109. An external charging dock or charger (not shown) can be provided with the system. Preferably, the battery is removeable and/or rechargeable. In an alternative aspect, a solar panel (not illustrated) may be provided that is attached to the top of the cooler to power the pump to eliminate the need for a battery, and/or to act as a backup to the battery.

The pump 2108 directs water into the basin 2106 in a manner similar to a "water fall" from a first end proximate to the pump to a second end which includes weir plate 2114 that allows the cooled water above a fixed height level to drain back into the cooler via gravity after passing over and/or through the beverage containers. The weir height is set at a level high enough to force the water level in the basin 2106 to rise to the top of any beverages contained in the basin, but low enough to enable water to drain at a sufficient rate over the weir. In some embodiments, as shown in FIG. 5, the weir may include orifices or slots 2115 to further promote rapid water flow thorugh the weir and draininge to enhance water currents alongside the beverage containers. Moreover, while the weir plate 2114 is illustrated in a vertical orientation, it may be tilted slightly in the direction of the flow to help provide a uniform flow that minimizes secondary flows. Preferably, cooling fluid flow through the unit 2100 is generally laminar, but it may also be optimized to generate turbulence in locations that will enhance thermal mixing. To facilitate flow through the unit and out through an exit port 2111 (as depicted in FIG. 7), the base plate of the basin 2106 may be sloped at several degrees toward the exit port 2111. Exit port 2111 may simply be an orifice, or may include an exit flow channel, as desired.

FIG. 7, which illustrates an underside perspective view of the modular quench unit 2100, illustrates a sloped bottom floor of the basin 2106 that connects to an upwardly extending peripheral wall of the basin, and further illustrates exemplary placement and positioning of the electronics housing 2109 and hose 2110. This view also clearly illustrtates cleats (e.g., 2122) which may be formed on the ends of the mounting pegs for gripping side walls of the cooler, and side grips or handles (e.g., 2124) which may be used to move the quench unit onto and off of the cooler.

Figure 8:
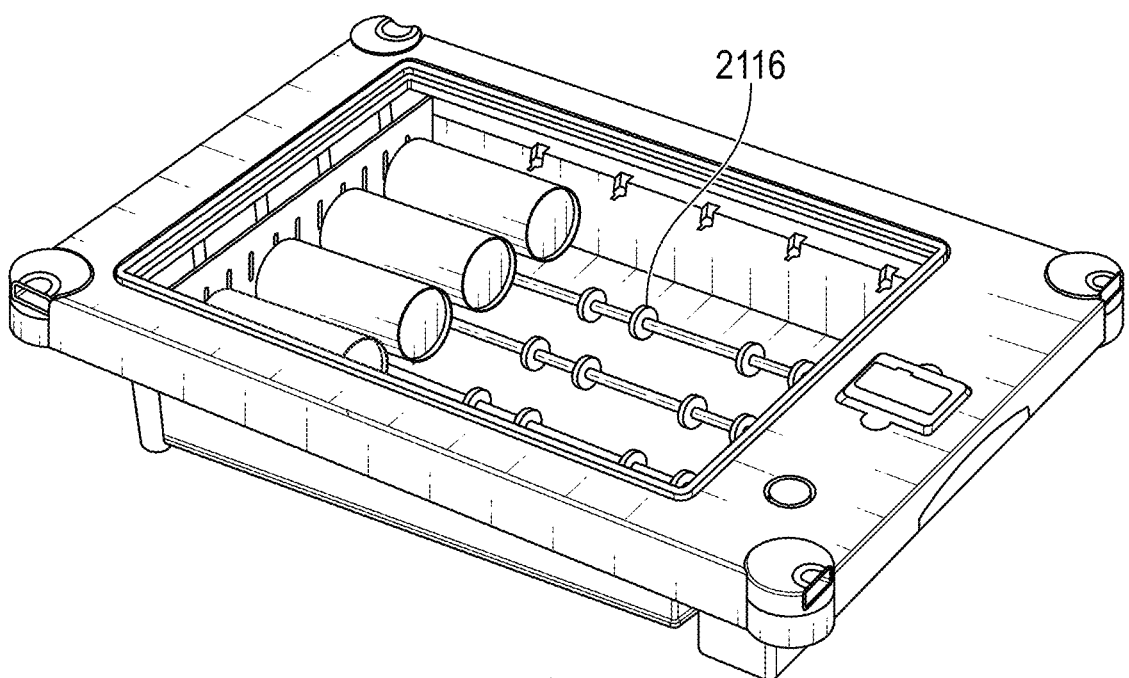
FIG. 8 is a top perspective view of the embodiment of FIG. 5 illustrating a beverage rotation system.

Referring to FIG. 8, the basin 2106 may also contain a removable roller wheel assembly 2116 which may by action of the rolling wheels, cause the beverages to rotate around their longitudinal axes to enhance removal of heat from the beverage containers. The wheel assembly 2116 may mechanically couple to a drive port that is connected to an electric motor within the electronics housing 2109. In another embodiment, instead of wheels on axles, helical screws can be mounted on the axles that traverse the length of the unit that have a sufficient diameter, pitch, and surface friction to both cause drinks to rotate that are situated parallel to the screws, but also to permit drinks to be rotated that are disposed across the screws, in a manner similar to which a worm gear causes an intermeshed gear to rotate.

To illustrate to a user of the system that the beverages are sufficiently cooled, the quench unit can also include lighting elements, such as an LED bezel that wraps around all or a portion of the top of the basin 216. The LED bezel may be illuminated based on current conditions. For example, in some embodiments, the LED bezel may emit a red flashing light when it is determined that the pump is not functioning properly, or to indicate a condition of the beverages not being cooled. Moreover, if desired, a photodetector can be provided and located behind a hole or small window in the frame 2102 (or simply on or within the frame 2102) that can detect when a top of the cooler is opened. A signal can be sent from the photodetector to a controller within the electronics housing 2109 that then stops the pump and rotation of the beverages, if desired, and energizes one or more LEDs in the bezel 2118 indicating the condition of the beverages. If desired, the LED ring surrounding the pushbutton 2130 can flash red or another color when the photodetector is activated upon opening the cooler.

Furthermore, any control system aspects described elsewhere herein can be adapted to the modular retrofit unit 2100. If desired, the control system can advantageously be implemented using an Ardunio or Raspberry Pi-based platform. The system can be controlled remotely, for example, by way of a bluetooth connection to a smartphone. Among other variables, a bluetooth connection to a mobile app can communicate one or more of (i) the current state of the unit, such as whether the quench cycle is operating or complete, interrupted, or idle (ii) the remaining quench time (if in a quench cycle), (iii) a default quench time that may be adjustable via the smartphone app, and (iv) the percent of battery life remaining. In addition, a level sensor can be incorporated into the electronics housing 2109 that can detect when the system is at an unacceptable slant for purposes of operation.

Figure 9:
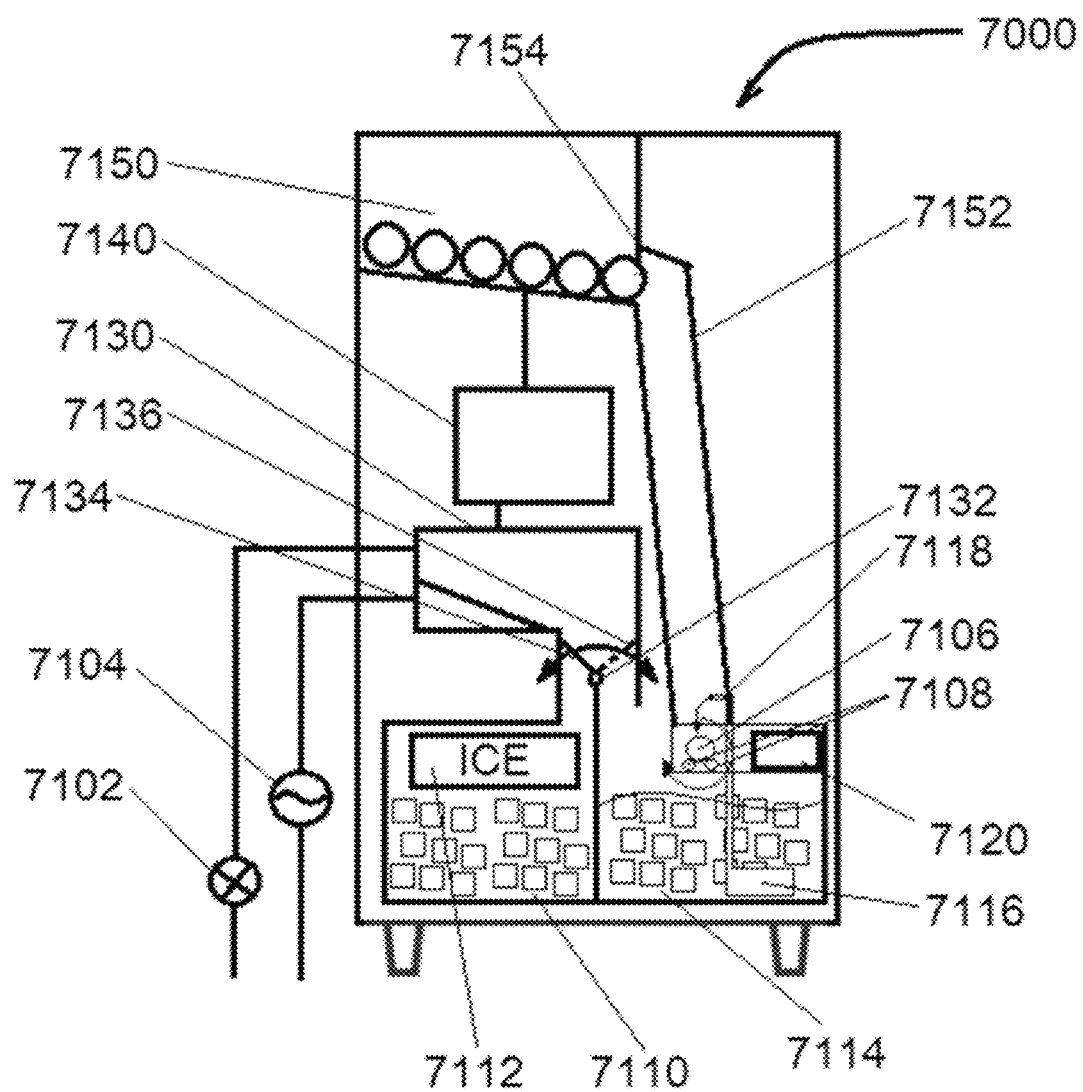
FIG. 9 is a schematic representation of a system for making ice and cooling beverages in accordance with the present disclosure.
Figure 10:
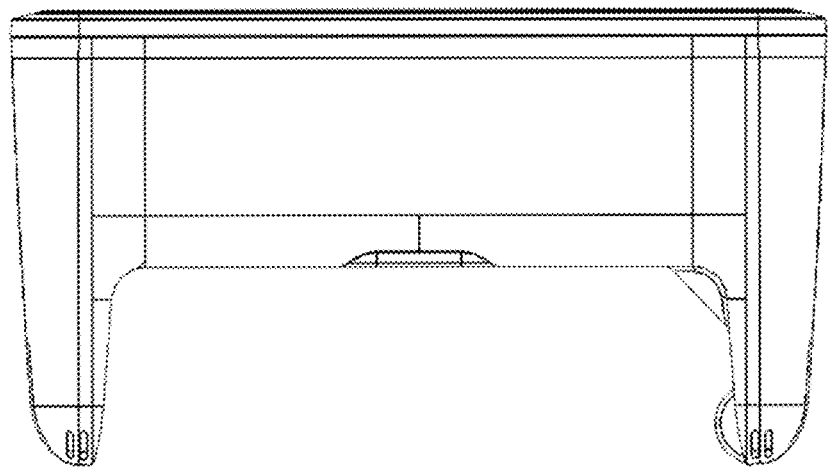
FIGS. 10-11 are front views of a further embodiment of a cooling unit in accordance with the disclosure with extendable legs in retracted and extended positions, respectively.
Figure 11:
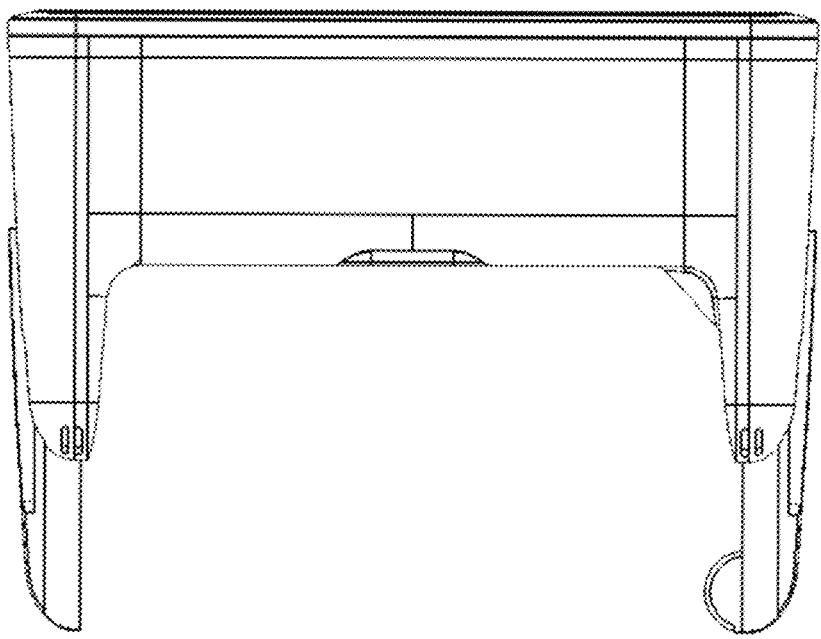
Figure 12:
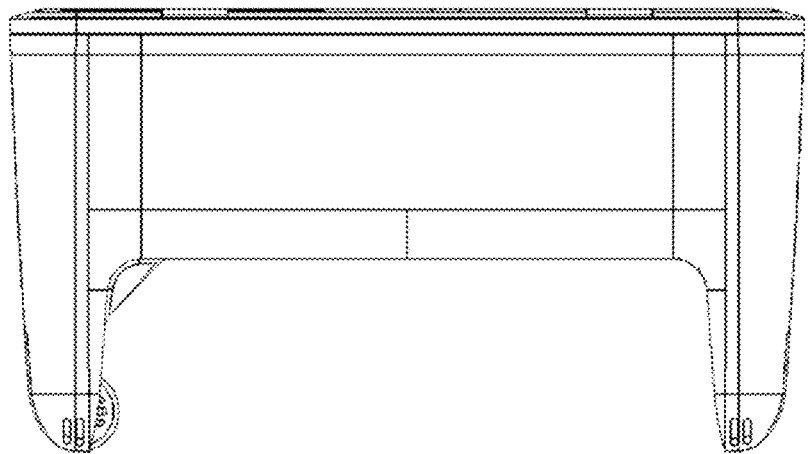
FIGS. 12-13 are rear views of the embodiment of FIGS. 30-31 with extendable legs in retracted and extended positions, respectively.
Figure 13:
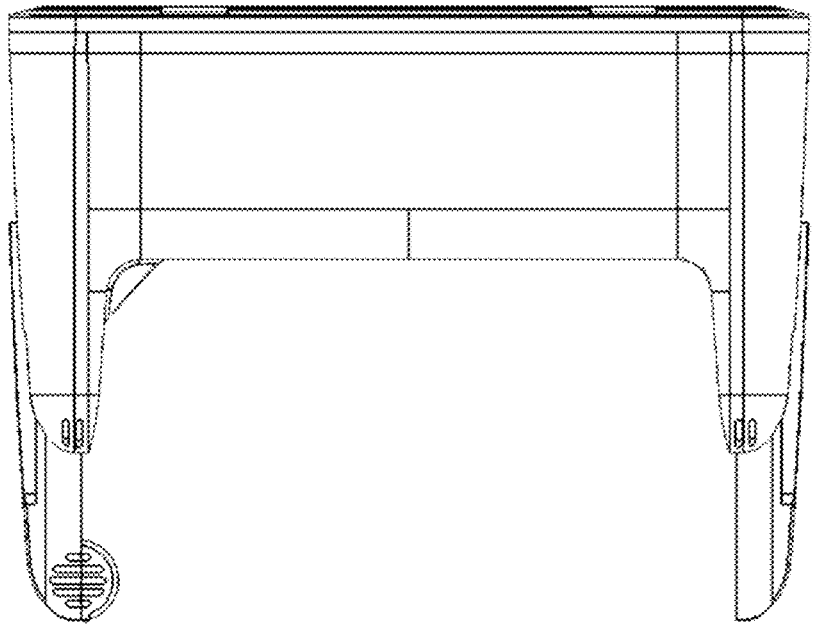
Figure 14:
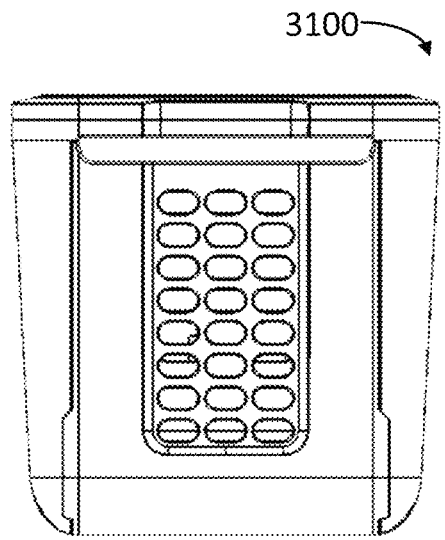
FIGS. 14 and 16 are left side views of the embodiment of FIGS. 30-31 with extendable legs in retracted and extended positions, respectively.
Figure 15:
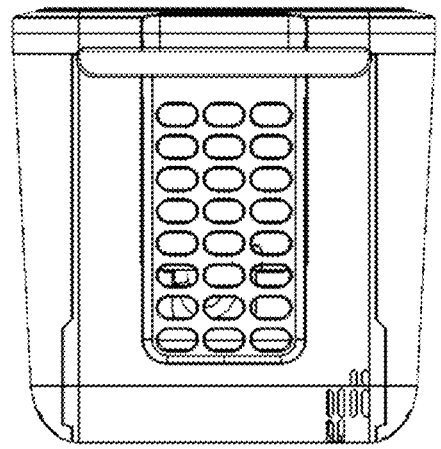
FIGS. 15 and 17 are right side views of the embodiment of FIGS. 30-31 with extendable legs in retracted and extended positions, respectively.
Figure 16:
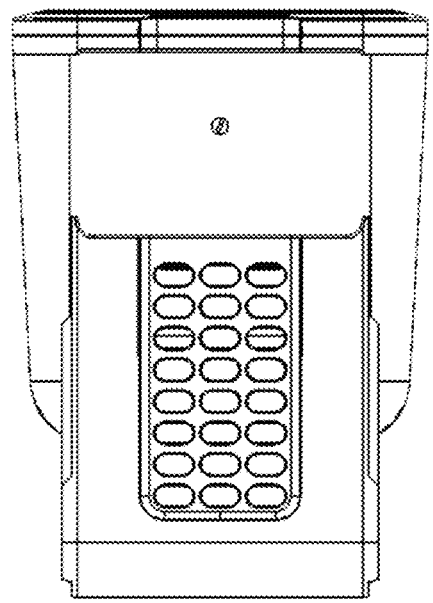
Figure 17:
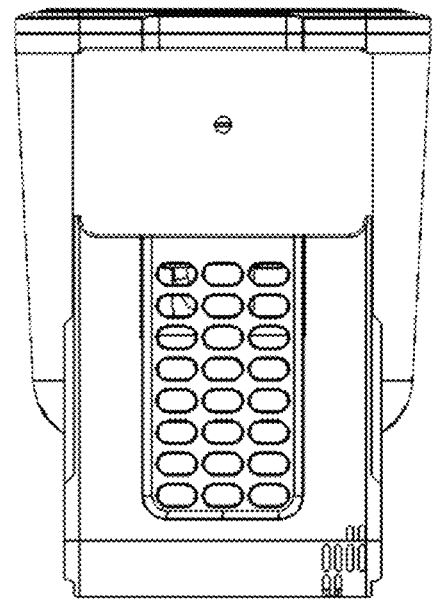
Figure 18:
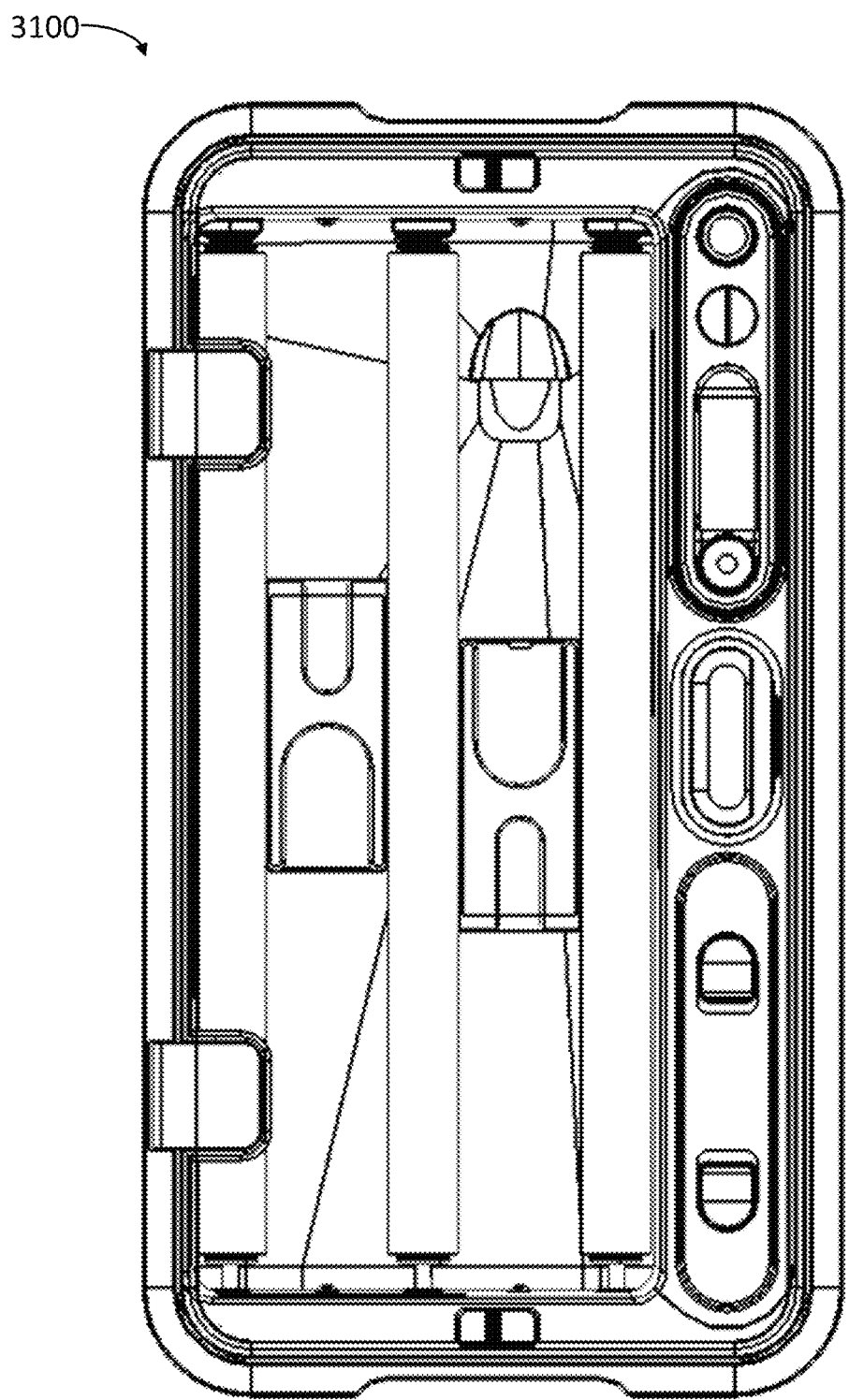
FIGS. 18 and 19 are bottom plan views of the embodiment of FIGS. 30-31.
Figure 19:
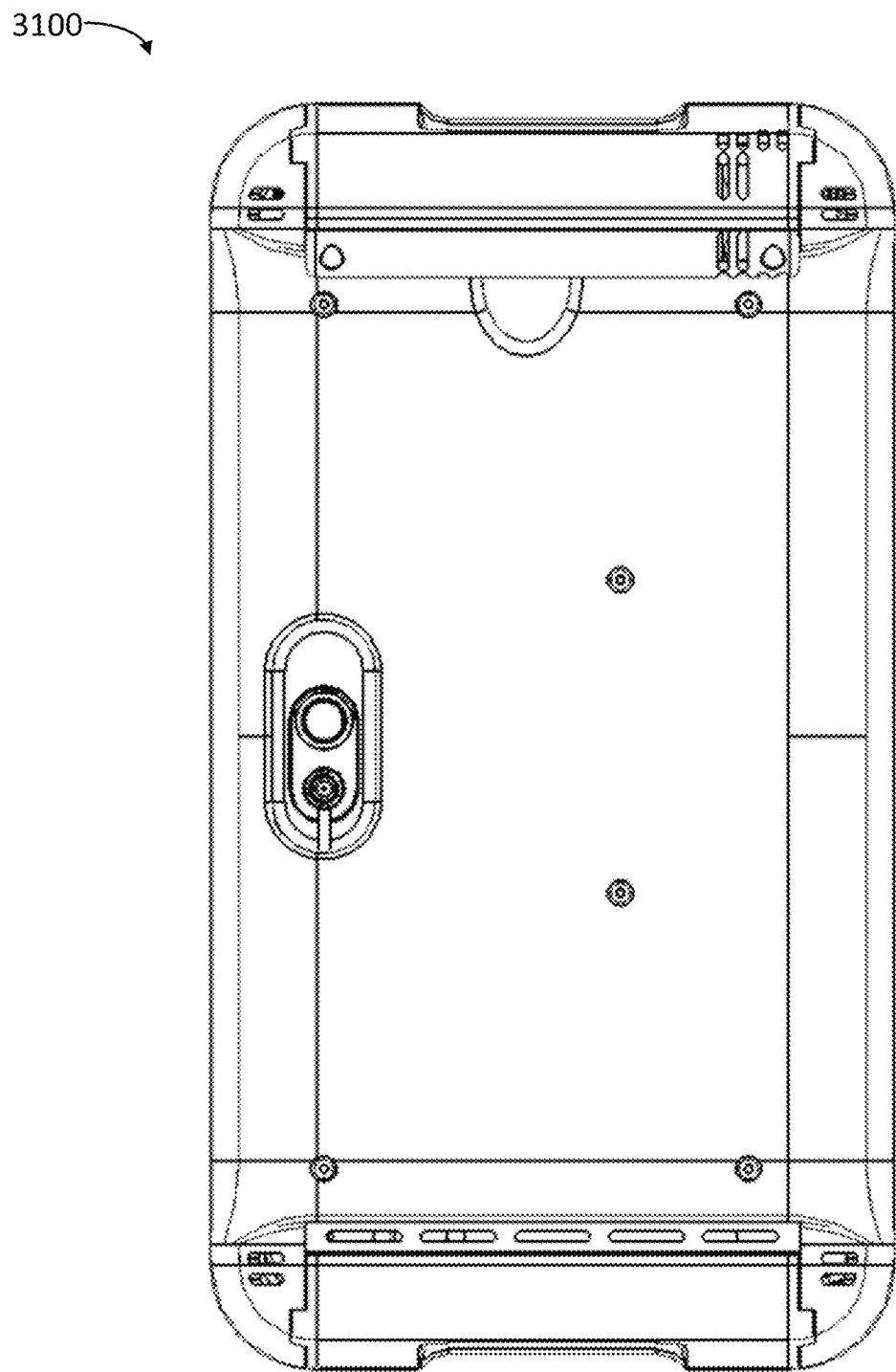
Figure 20:
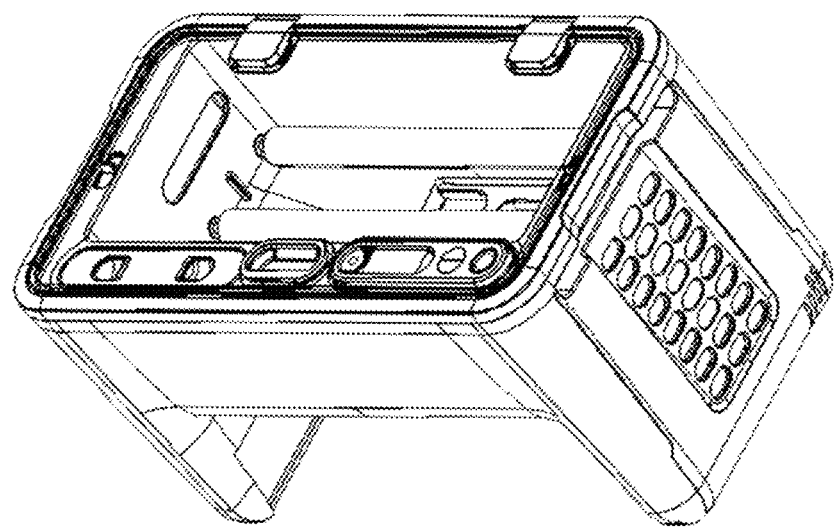
FIGS. 20 and 21 are top front right and top rear right isometric view of the embodiment of FIGS. 10-11.
Figure 21:
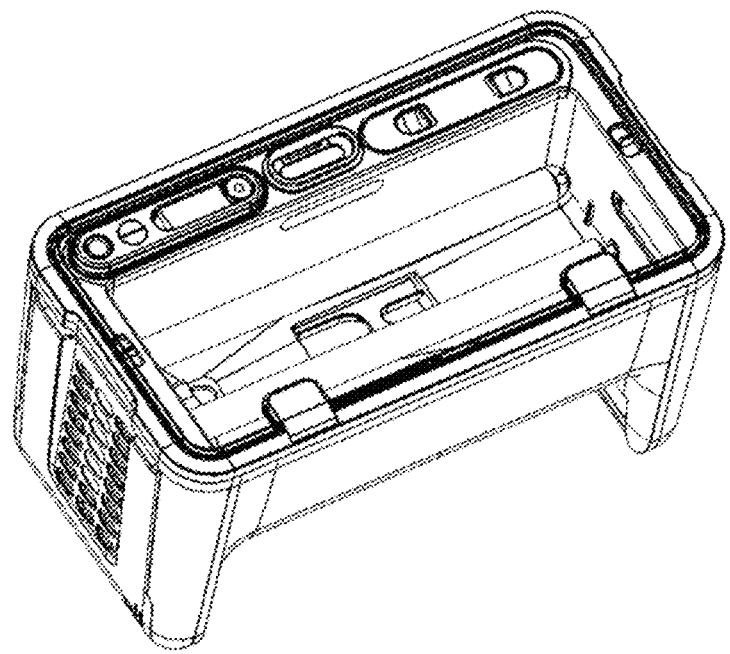
Figure 22:
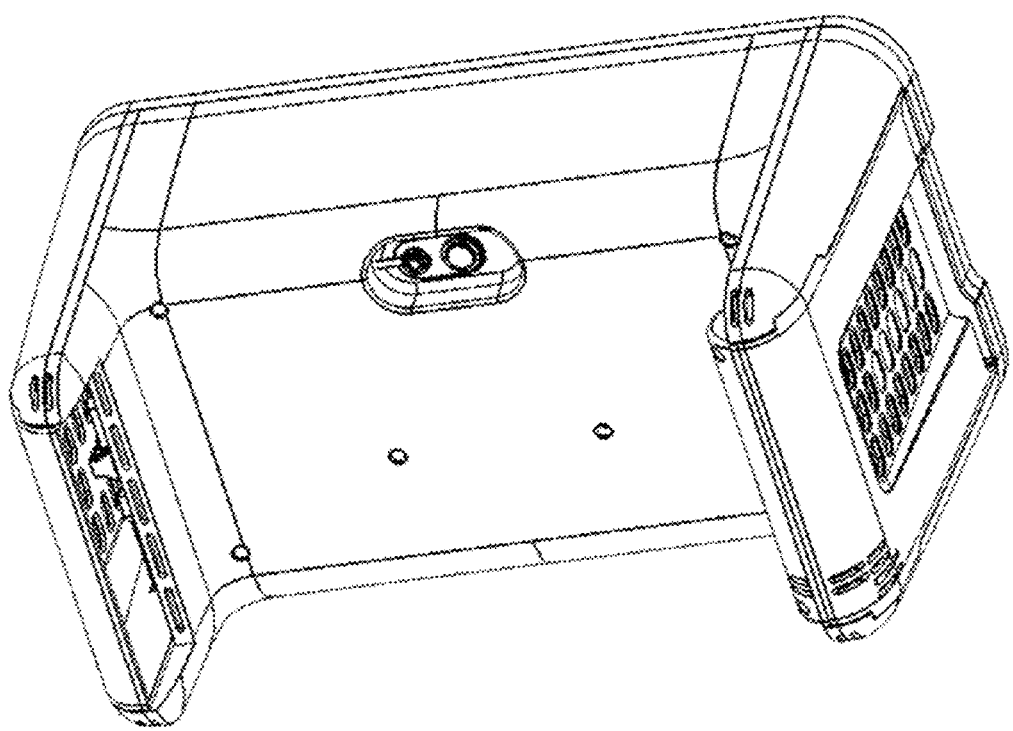
FIGS. 22 and 23 are bottom front right and bottom rear right isometric view of the embodiment of FIGS. 10-11.
Figure 23:
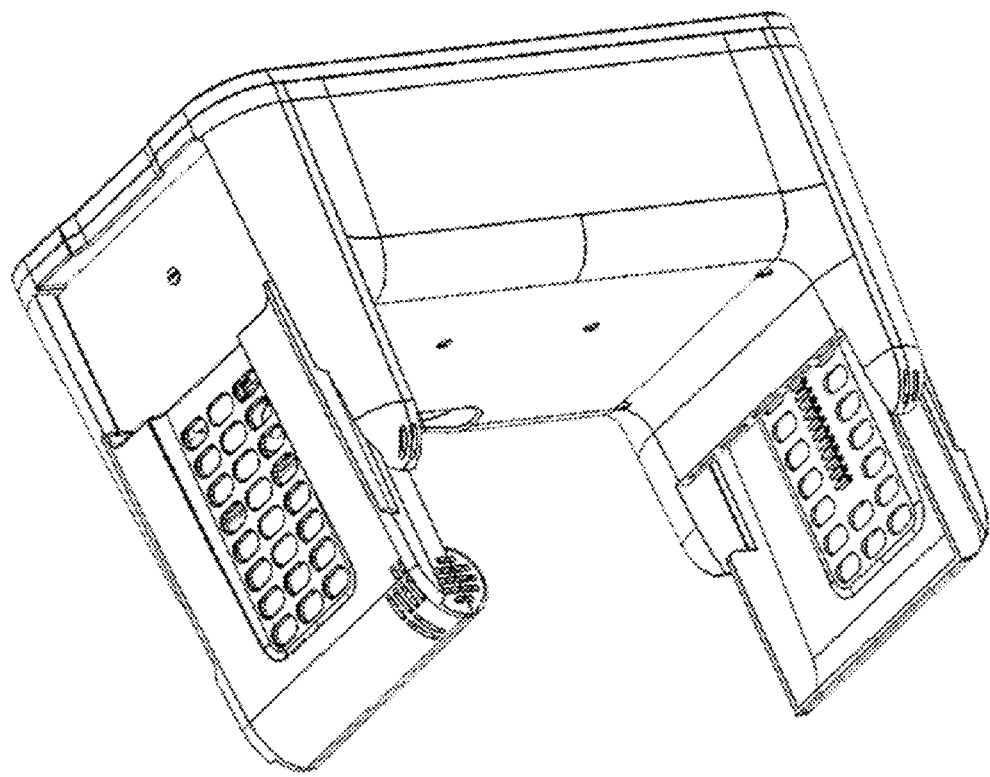
Figure 24:
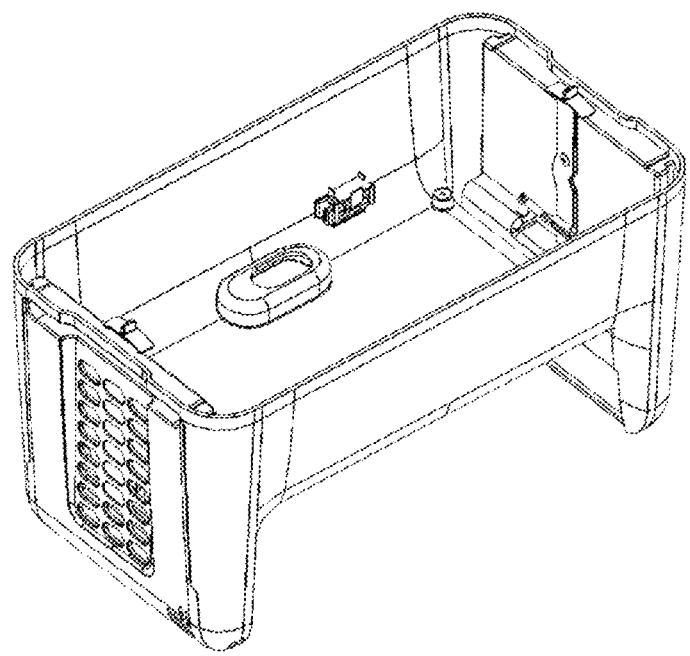
FIGS. 24 and 25 are perspective views of an outer housing portion of the embodiment of FIGS. 10-11.
Figure 25:
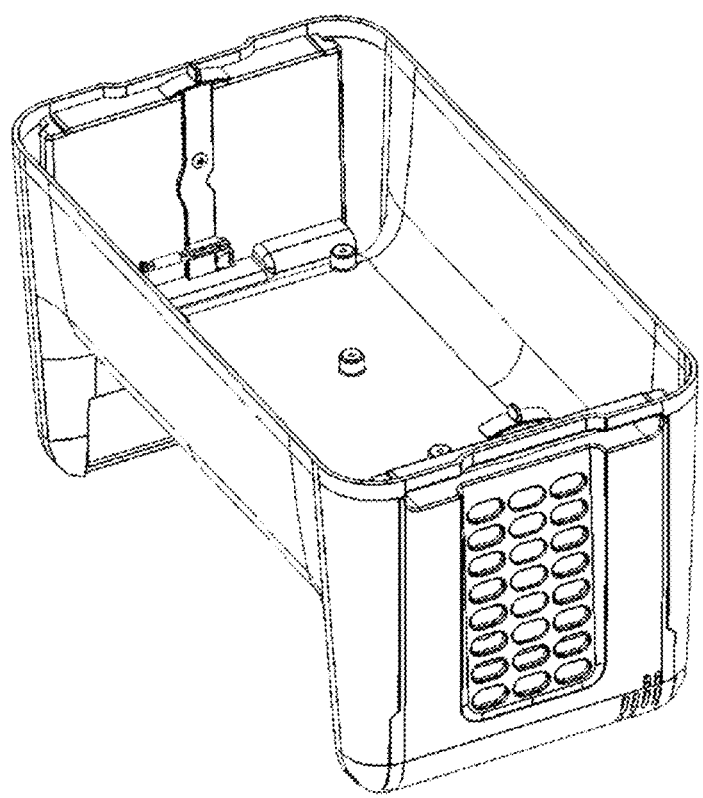
Figure 26:
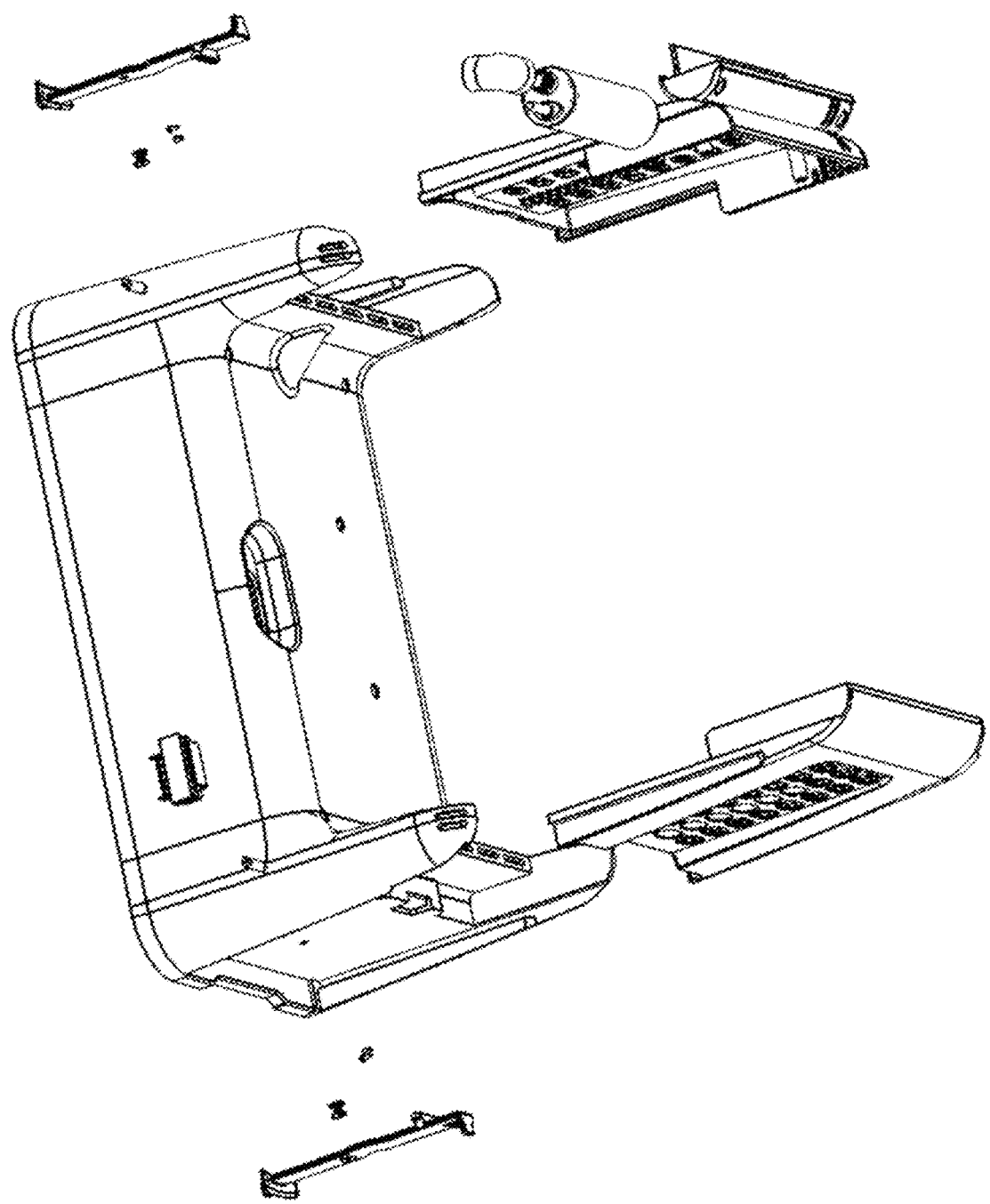
FIG. 26 is an exploded bottom left perspective view of the outer housing portion of FIGS. 24 and 25.
Figure 27:
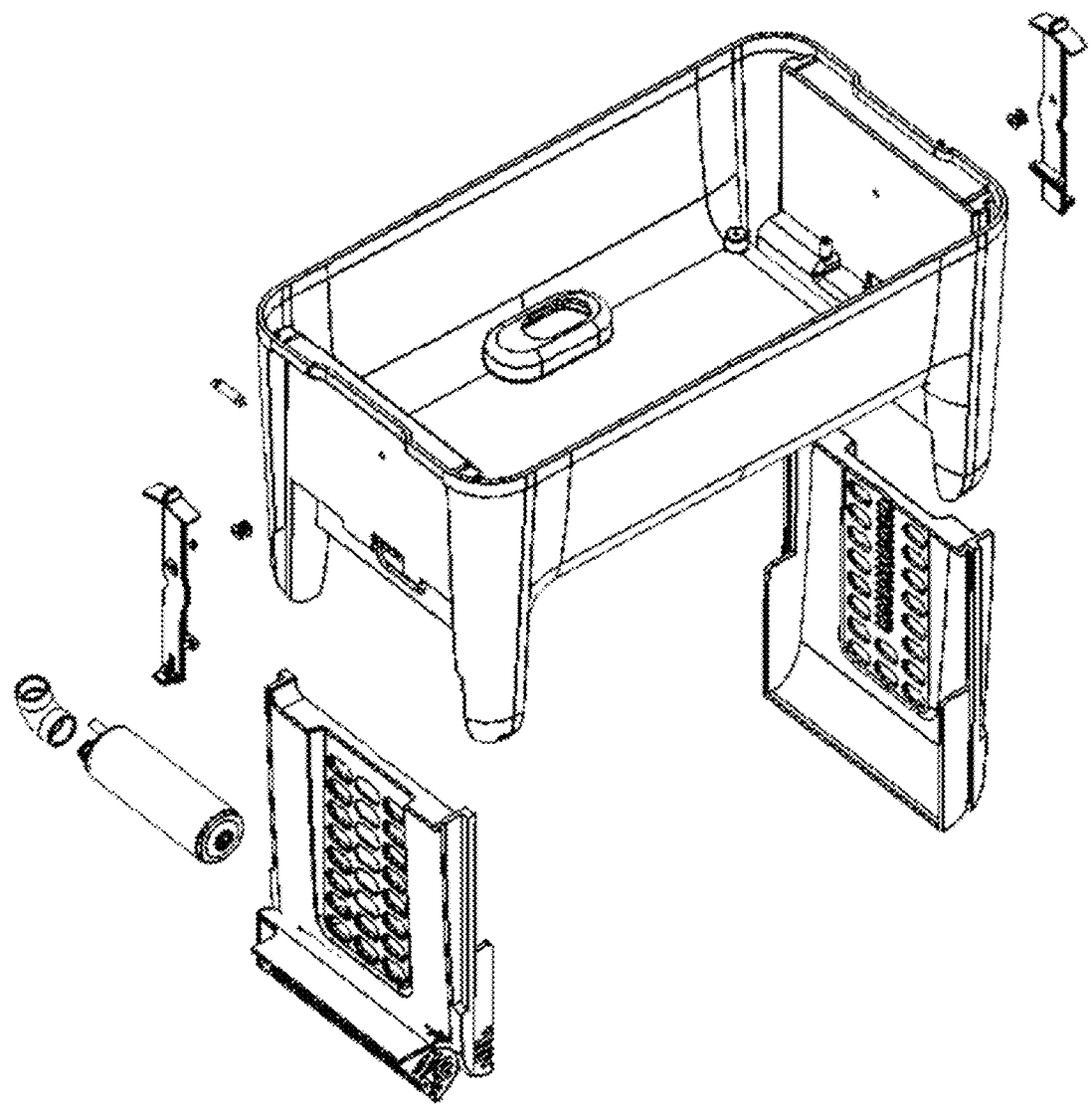
FIG. 27 is an exploded top right perspective view of the outer housing portion of FIGS. 24 and 25.
Figure 28:
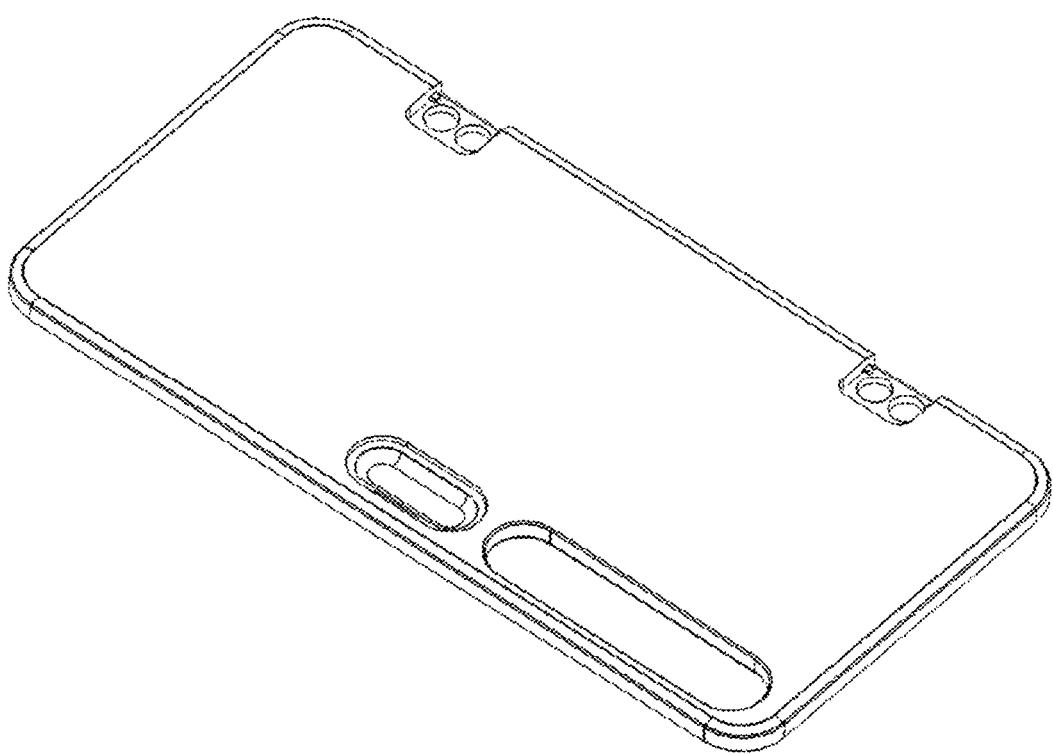
FIG. 28 is a top isometric view of a removable lid of the embodiment of FIGS. 10-11.

For purposes of further illustration, FIG. 9 presents a system 7000 for producing ice and cooling beverage containers. System 7000 be a single, stand-alone unit as depicted, or may be composed of two or more devices that are operably coupled together. In some implementations, system 7000 can be a combination vending machine and ice dispenser. In another implementation, the system 7000 can include a vending machine operably coupled to an ice output chute of a separate ice making device, such as those present in hotel establishments, typically on each floor.

As illustrated, system 7000 inclues a tank 7114 for holding a chilled mixture of ice and water, illustrated as ice cubes floating in a liquid medium. The system 7000 further includes an ice maker 7130 that may be similar to or the same in function as that described with respect to those set forth in U.S. patent application Ser. No. 14/877,143, filed Oct. 7, 2015. The ice maker 7130 can similarly be provided with a selectable switch 7132 that can control, for example, a flap that can cover one of two output channels from the icemaker 7130. In a first position 7134, the flap can cover a chute or conduit leading to an ice storage compartment 7110, resulting in ice being directed into the chilled bath 7114. When moved to a second position 7136 (e.g., manually or electronically), the flap can cover the entrance to the water bath, and leave the chute or conduit to the ice storage bin 7110 open, permitting the ice maker 7130 to fill the ice storage compartment 7110. A controller 7140 can be operably coupled to the ice maker 7130 and the switch 7132 to control the making and dispensing of ice. The ice maker 7130 can be selectively connected or otherwise connected to a water input line 7102 via a valve, and an electrical power in put 7104 to provide power to the icemaker. The ice storage compartment can be accessed, for example, by way of a door 7112 in a front face of the system 7000.

In further accordance with the schematic diagram of FIG. 9, the system can include a hopper or other storage comparment 7150 that is configured to hold one or more beverage containers for cooling, and subsequent dispensing. A governor or mechanically door 7154 can permit a beverage container to be transported by gravity or conveyor down through a chute 7152, for example, to a quench unit below that can include a reservoir into which chilled water is pumped from a pump 7116 through a conduit 7118, and over a beverage container 7106 that may be laying on its side as shown, or may be standing up or laying at an angle, for example. One or more motorized rollers 7108 can rotate the container 7106 while it is being sprayed or otherwise coated with chilled water to effectuate cooling, as descibed elsewhere herein. While the overall device can be refrigerated, it is possible to apply some or all of the cooling to the container 7106 by way of the quenching, so as to reduce energy consumption resulting from having to cool all of the containers in the machine down to a desired temperature. A door or other access 7120 can be provided to permit a user to extract the container 7106 after it has been quenched. The system 7000 can use temperature sensors, timers displays and the like to let a user know when the container is quenched and the beverage is ready. If desired, and if provided in the form of a vending machine, system 7000 can interface with any desired form of payment (cash, credit, mobile device payment, fingerprint or other biometric value) that can cause the controller to dispense and cool the container 7106.

If desired, the switch 7132 can be configured to direct ice into the ice storage compartment in response to the level of ice in the ice storage compartment. The switch or diverter 7132 can be configured to direct ice into the tank in response to the level of ice in the tank. If desired, the system can be configured to force air circulation through the system to help cool the containers of beverages. Further components and details of the embodiment of FIG. 9 can be carried out in accordance with various embodiments of cooling chests with pull out drawers described in U.S. patent application Ser. No. 14/877,143, filed Oct. 7, 2015.

TEST OF DEVICE OPERATION

For purposes of testing, a prototype made from a modified Fisher and Paykel DD24D dish washer and an Ice-O-Matic GEMD270A ice maker was created. The device further included a Lifegard™ Quiet One™ Model 4000 fluid pump for circulating cooling fluid that was in fluid communication with one inch diameter (nominal) fluid lines and a 25 gallon tank for holding an ice water bath. The ice maker built an ice stockpile before the test over a six hour period and maintained the stockpile through the test. The pump delivered cold water from the ice water bath to the drawer of the dishwasher, wherein the drawer divider directed water flow around the drawer. An outlet in fluid communication with an ice bath via a vertical exit conduit that maintained the water in the drawer at a predetermined level. A plurality of temperature sensors in the form of thermocouples (in this case, six) were located at each of (i) a location for measuring ambient temperature, (ii) the ice bath, (iii) the drawer inlet, (iv) the drawer outlet, (v) an aluminum can containing a beverage under pressure, and (vi) a glass bottle also containing a beverage under pressure. Table 1 below (taken from http://craftbeertemple.com/videoblog/serving-beer) presents a chart that was used for estimated cooling times of different types of beer in different container types that was referred to herein for comparison purposes.

TABLE 1

| Zone | Range | Temp (F.) | Beer Type | Can (cooling time in min.) | Glass (cooling time in min.) | Plastic (cooling time in min.) |
|---|---|---|---|---|---|---|
| 1 | 35-40 | 35-40 | American Lagers, Malt Liquors, Light Beers | 3-5 | 10 | 35 |
| 2 | 40-45 | 40-45 | Pilsners, Ligh-bodies Lagers, Kolsch, Belgium Wit Hefeweizen, Berliner Weisse, American Wheat | 1.5-3 | 6-10 | 17-15 |
| 3 | 45-50 | 45-50 | American Pale Ales, Medium-bodied Lagers, IPA, Porters, Alt, Irish Stouts, Sweet Stout | <1-1.5 | 4-6 | 14-17 |
| 4 | 50-55 | 50-55 | Sour Ales, Lambic/Gueuze, English Bitter, Strong Ales, Bocks, Scotch Ales, Baltic Porters, Belgium and Trappist Ales | <1 | 3-4 | 7-9 |
| 5 | 55-60 | 55-60 | Imperial Stouts, Belgian Quads, Belgian Strong Ales, Barley Wines, Old Ales, Dopplebock, Elsbock | <1 | 2-3 | 4-7 |

Comparative data was also obtained from Episode 29 of the 2005 season of the television show "Mythbusters®" titled "Cooling a Six-Pack". Table 2 presents the prototype cooler results against Mythbuster performance results for various cooling modes.

TABLE 2

| Thermally insulated Cooler | Cooling results after 5 minutes (° F.) | Time to cool to 38-39° F. (min.) |
|---|---|---|
| Refrigerator | 60 | Over 40 |
| Ice | 57 | 30 |
| Freezer | 55 | 25 |
| Ice Water | 44 | 15 |
| Salt Water | 36 | 5 |
| Blue Quench Pull Out Drawer Chest | 38 | 4-5 |

Figure 3:
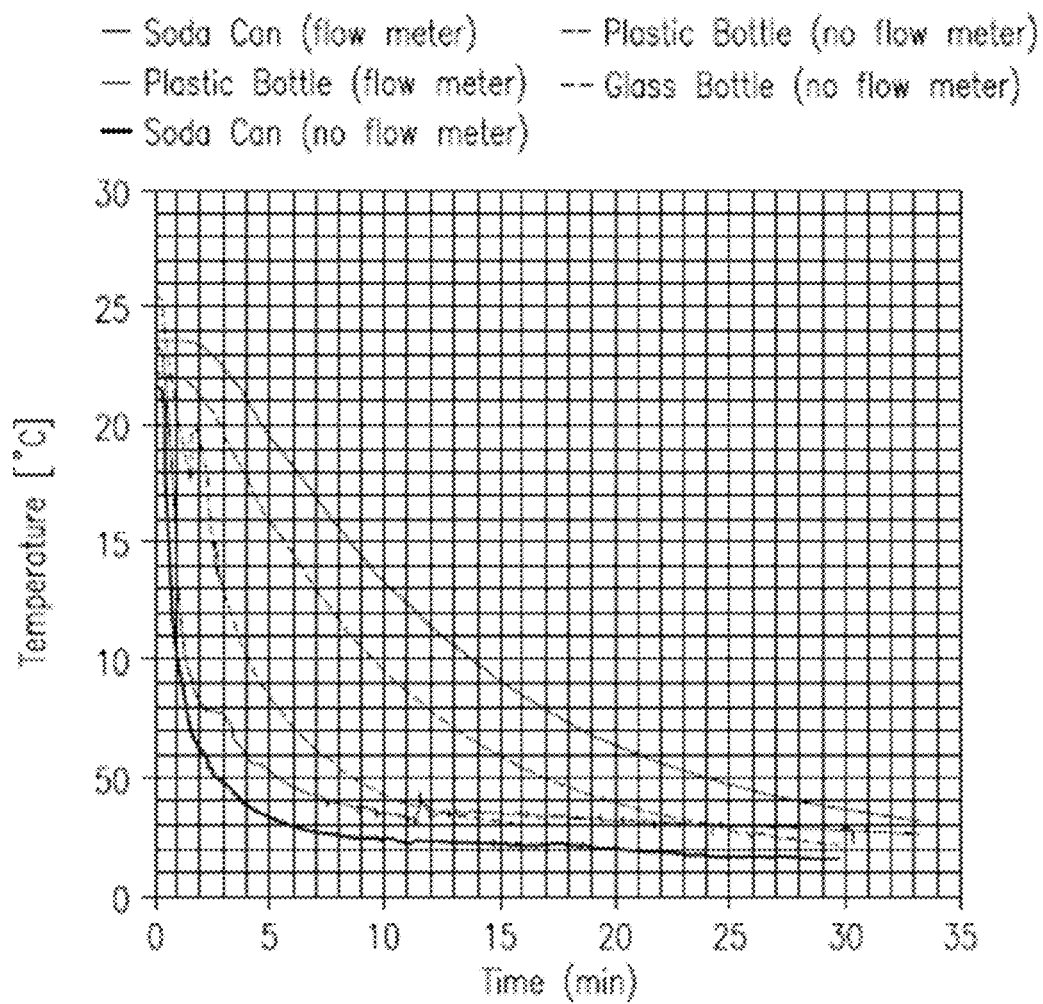
FIGS. 3 and 4 are graphs showing cooling speeds for various beverages over time obtained during a test of a thermal management device according to an embodiment of the present disclosure.
Figure 4:
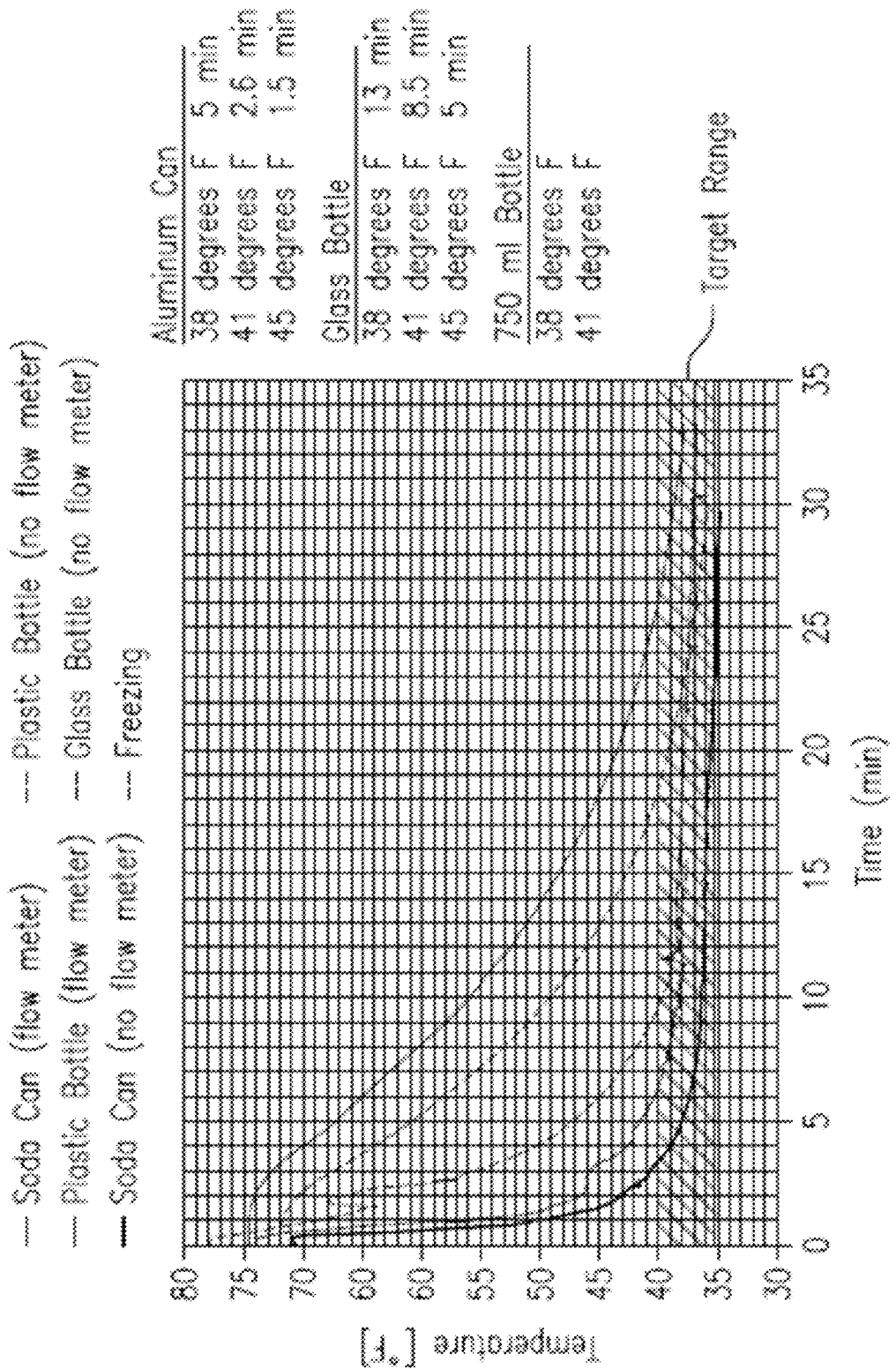

Impressively, the prototype substantially met or exceeded the performance of every cooling method reported by Mythbusters. Cooling speeds achieved for different types of beverages and containers are illustrated in FIGS. 3-4 in accordance with the test. In particular, data are presented for each of (i) a soda can with and without a flow meter (to account for the effect of the flow meter), (ii) a plastic bottle with and without a flow meter and (iii) a glass bottle without a flow meter. The icewater bath maintained a steady temperature of about 35° F. As can be seen, the disclosed technique has proved very effective at cooling filled beverage containers quickly.

FIGS. 10-42 illustrate a further embodiment of a retrofit unit in accordance with the disclosure having many of the same components of the previous embodiment including a motorized drive unit that drives a plurality of gear driven axles, a recirculating water pump, battery and electronics housing.

Figure 29A:
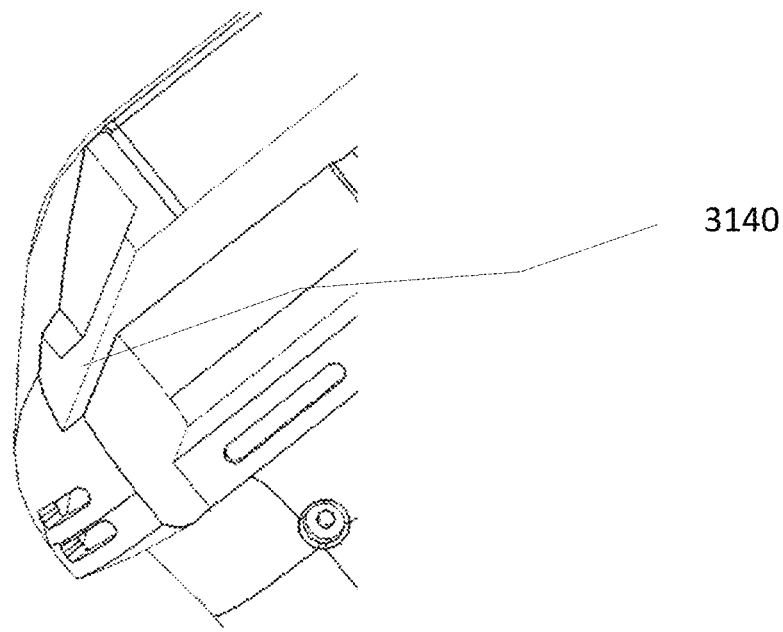
FIG. 29A is an enlarged view of a portion of the sidewall of the outer housing showing a guide track for an extendable leg of the device.
Figure 29:
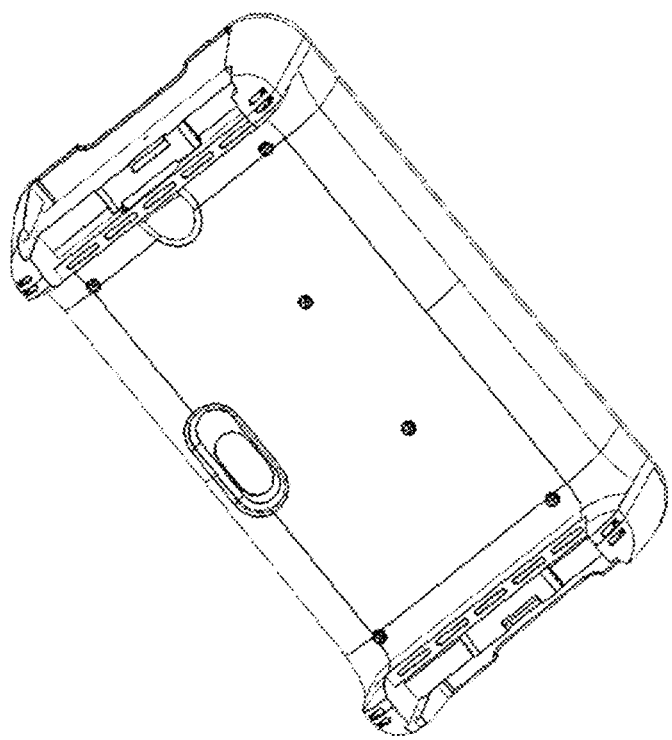
FIG. 29 is a bottom isometric view of the outer housing of FIG. 24.
Figure 30:
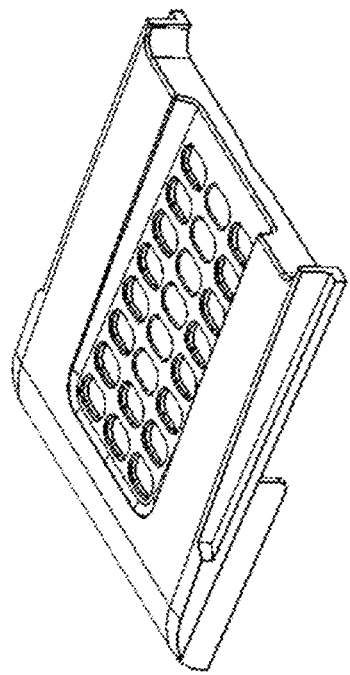
FIGS. 30-31 are isometric outer and inner views of a left leg of the embodiment of FIGS. 10-11.
Figure 31:
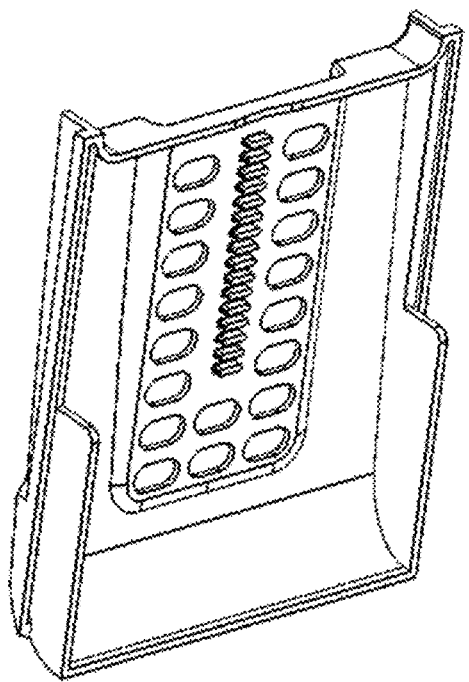
Figure 32:
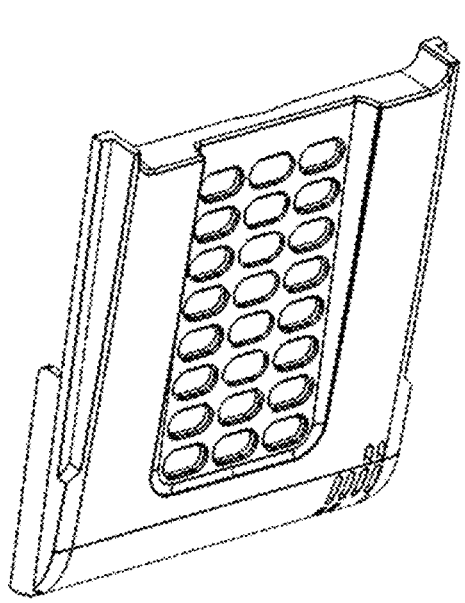
FIGS. 32-33 are isometric outer and inner views of a right leg of the embodiment of FIGS. 10-11.
Figure 33:
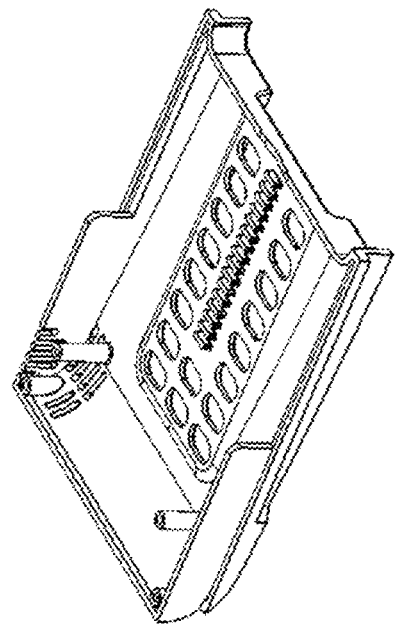
Figure 34:
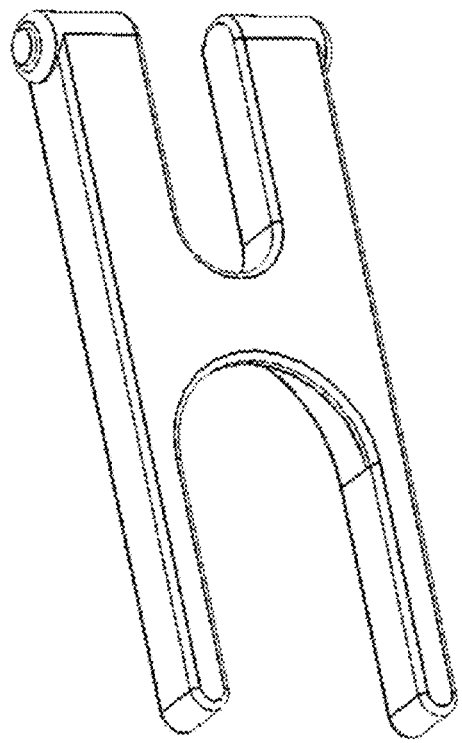
FIGS. 34-35 are isometric views of bottle guides for controlling the motion of necked containers in accordance with the present disclosure.
Figure 35:
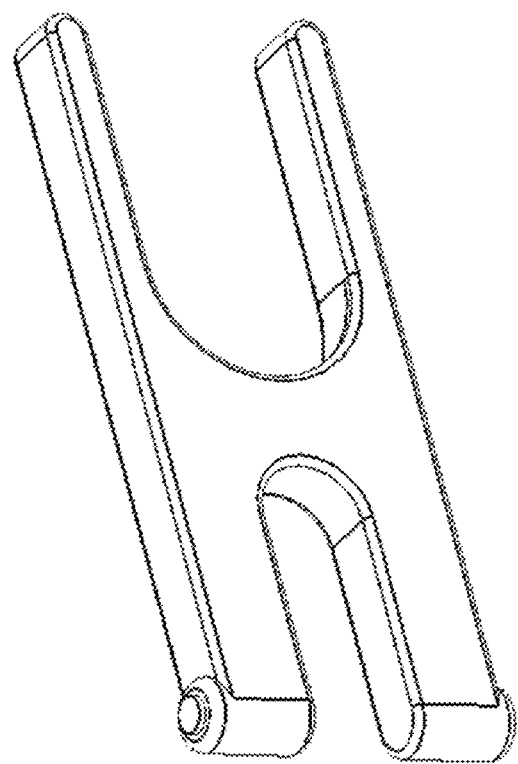
Figure 36:
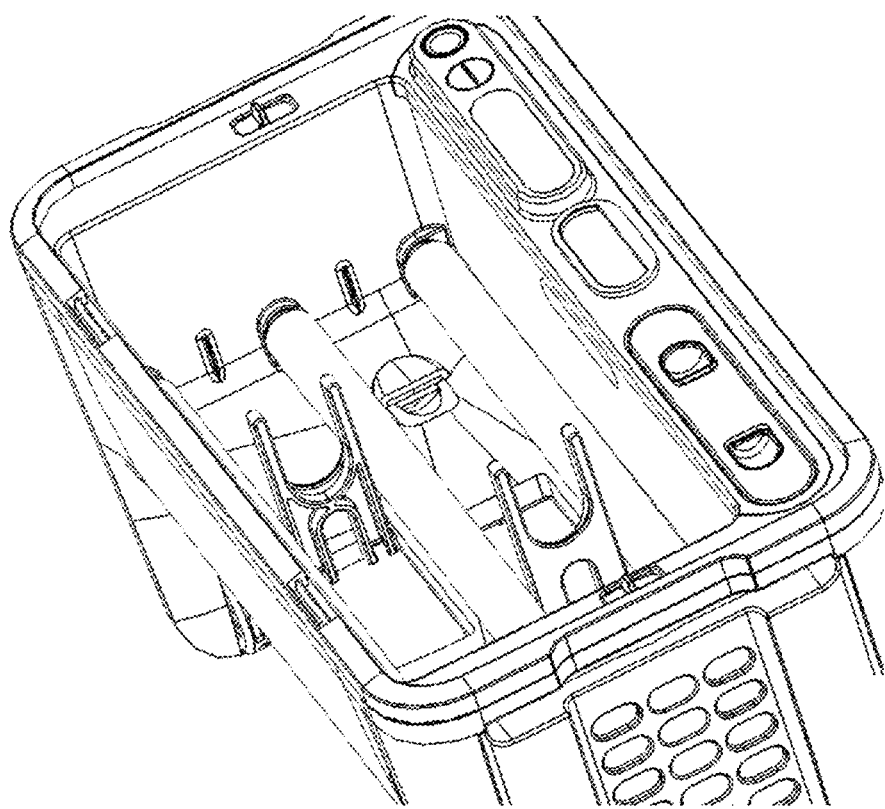
FIGS. 36-37 are isometric views of the bottle guides of FIGS. 34-35 in a deployed position.
Figure 37:
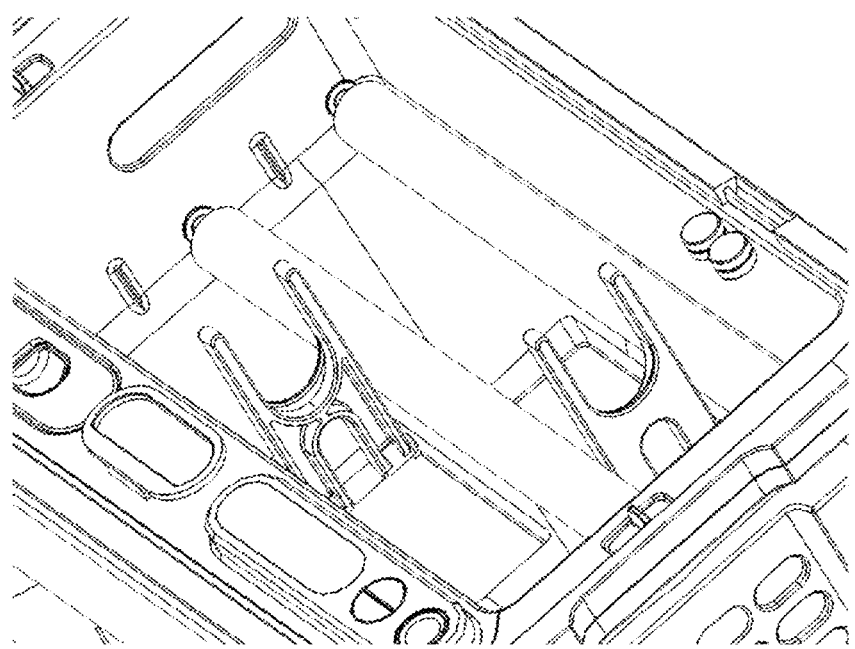
Figure 38:
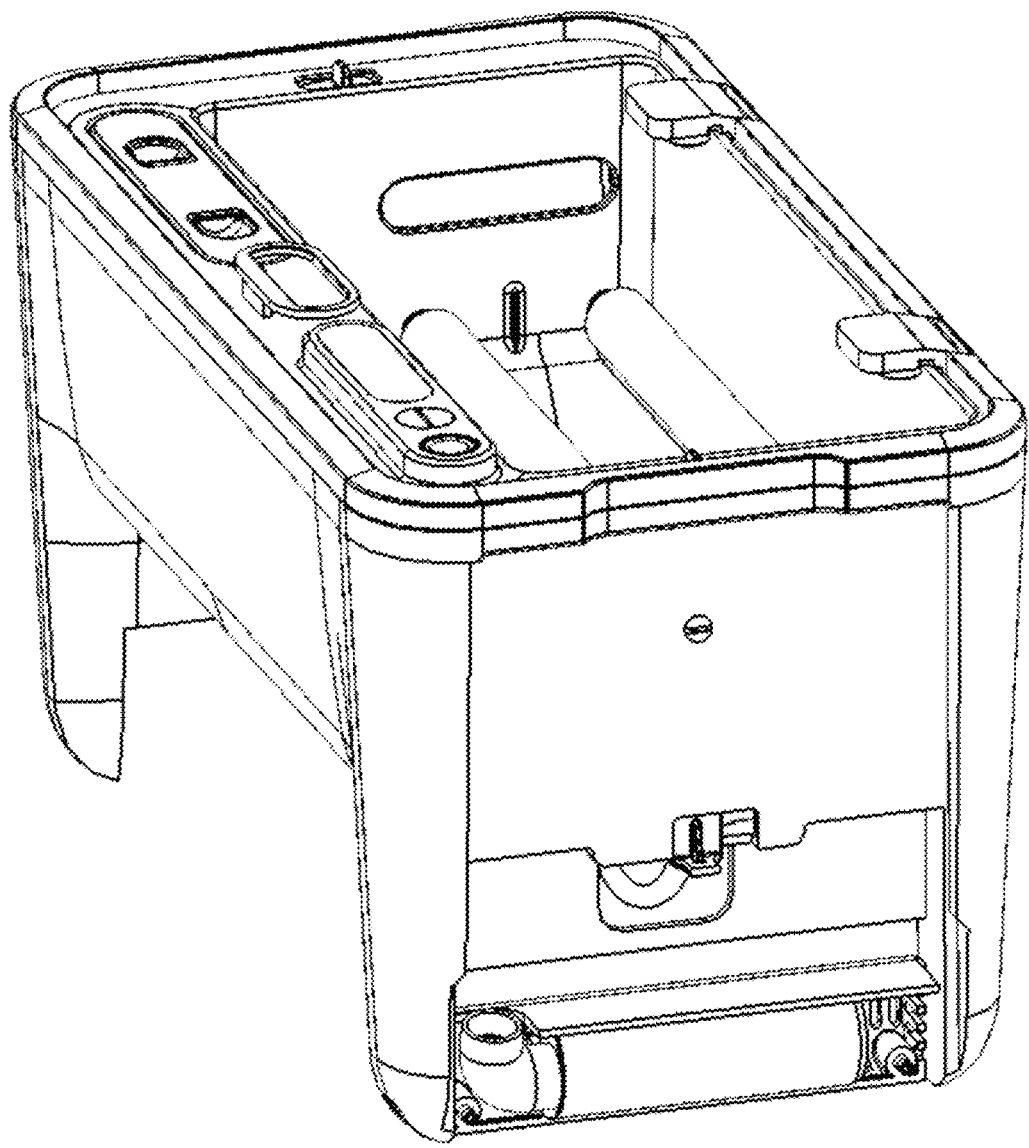
FIG. 38 is an isometric view of the cooling unit with the extendable legs and lid removed.
Figure 39:
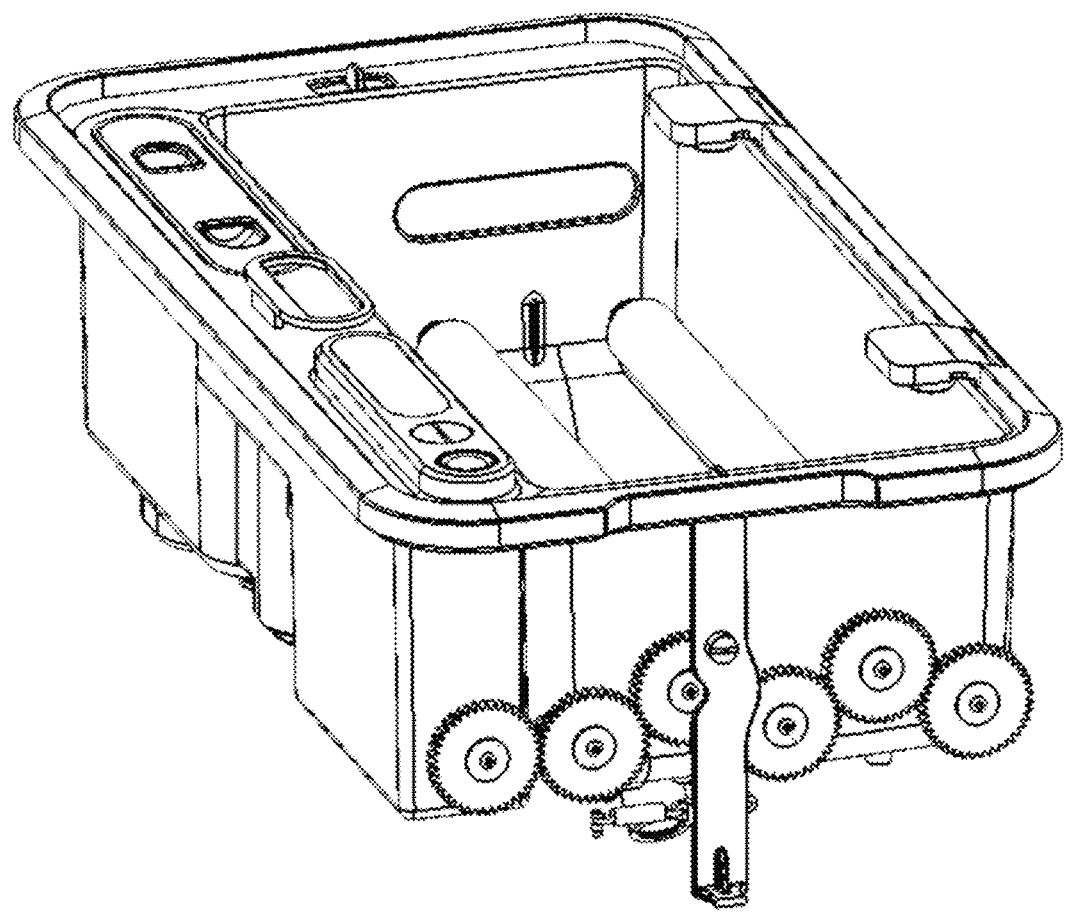
FIG. 39 is an isometric view of an inner tub assembly including a plurality of rollers and an associated gear drive and motor.

The illustrated embodiment includes a tapered design that has a profile that diminishes transversely (gets thinner) at lower portions so as to fit into a tapered interior of a cooler. The embodiment includes deployable panel shaped legs (FIGS. 30-33), the vertical edges of which are received in guide tracks molded into a tub of the exterior housing (FIG. 29A). As can be seen, the deployable extendable panel legs are situated along a middle region of the side of the cooling unit. This is because vertical downward displacement of these panels does not interfere with the corners of a cooler in which the cooling unit 3100 is placed. The corners maintain their shape because they do not move. But, the panel shaped legs can be deployed downwardly. They can be moved in incremental amounts by virtue of a rack formed from a row of openings or depressions that mate with a spring pawl attached to the housing as illustrated in the drawings.

Figure 40:
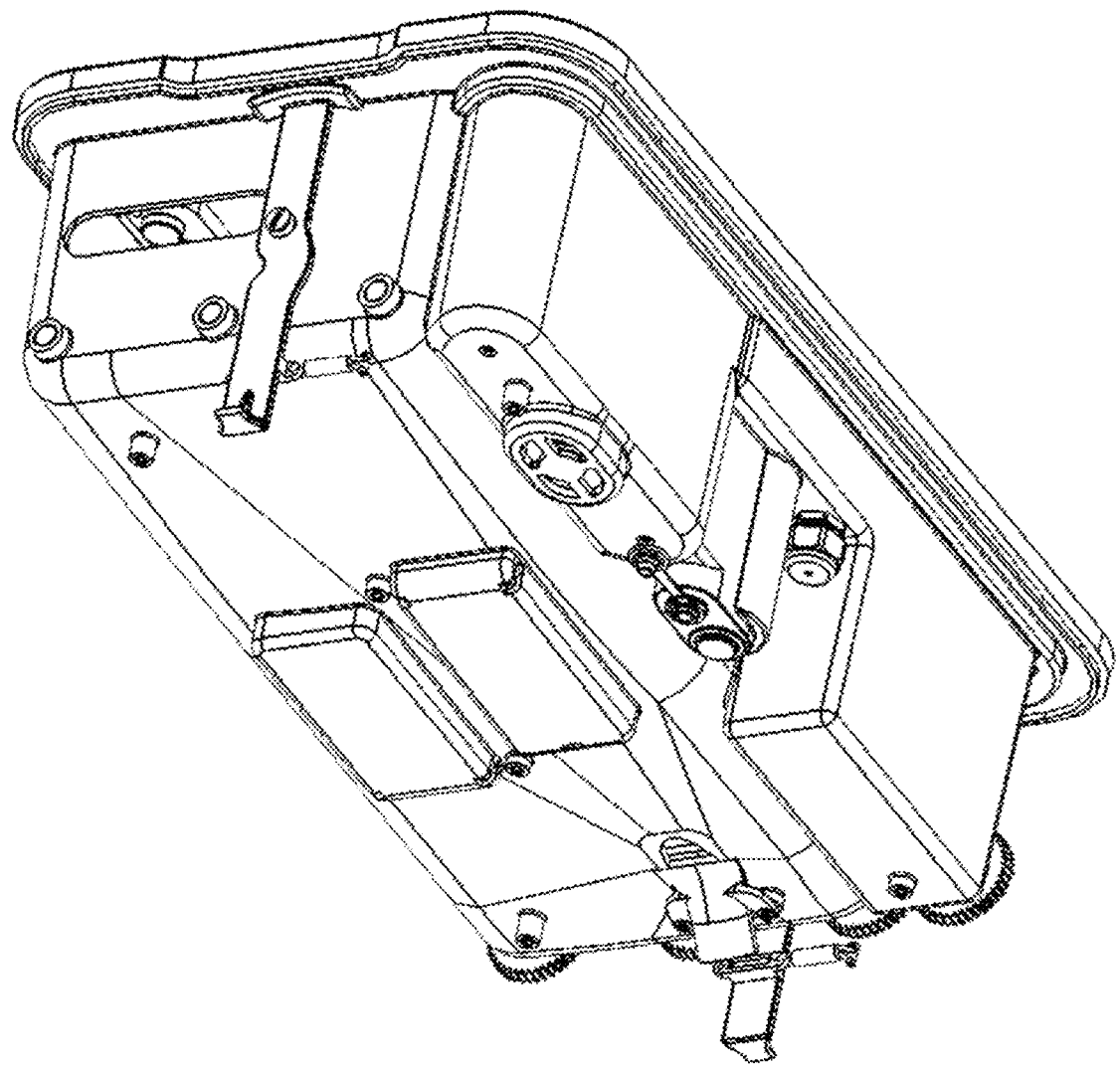
FIG. 40 is a bottom isometric view of the assembly of FIG. 39.
Figure 41:
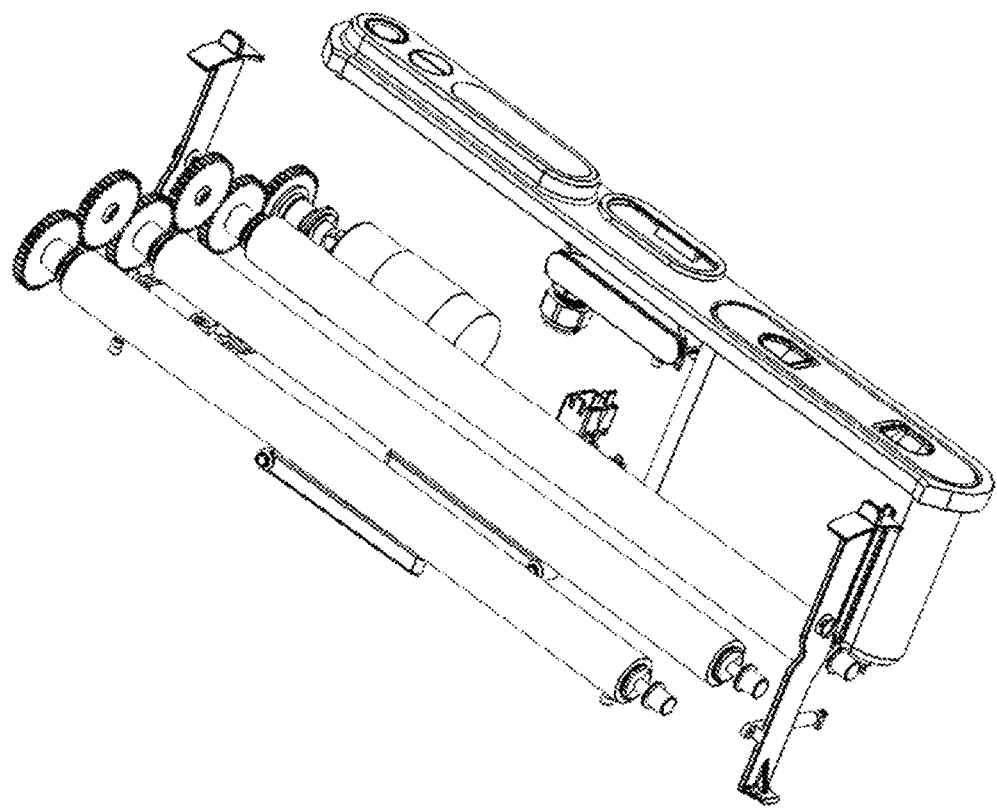
FIG. 41 is a perspective view of the assembly of FIG. 59 with the tub removed to illustrate the drive train.
Figure 42:
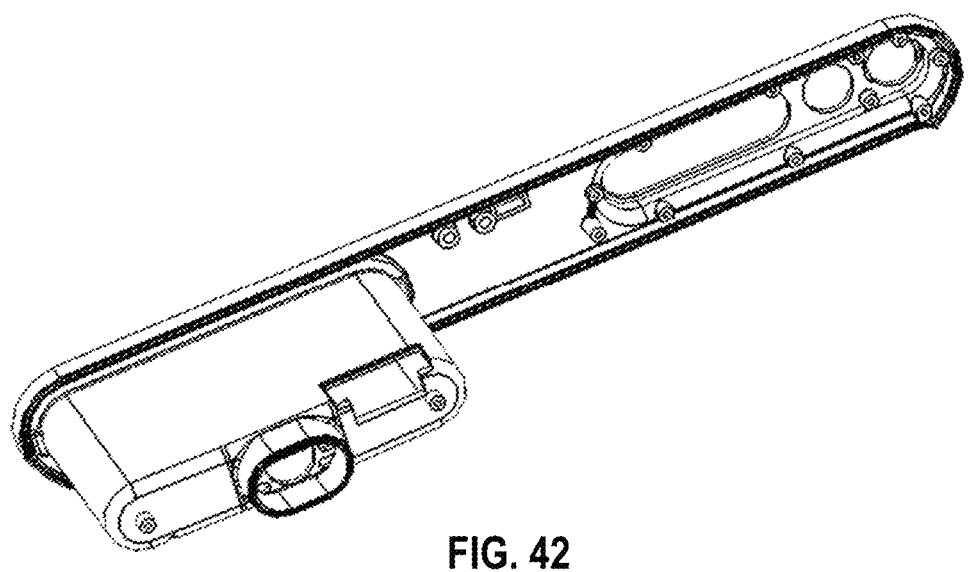
FIG. 42 is a figure illustrating a frame portion that fits in to the tub assembly of FIG. 39 that in turn holds a removable energy supply (e.g., rechargeable battery).

The right side leg of the cooling unit 3100 includes a pump housing that is situated at a bottom thereof that includes a water pump that draws chilled water in from the bottom of a cooler, and pumps it up through a conduit and into an inner tub of the assembly through one or more openings. The water then leaves through exit spouts defined in a wall of the inner tub (FIG. 40).

Containers having extended necks, such as a champagne bottles, can be held in place with deployable guide forks (FIGS. 34-37) that maintain the bottle in a proper orientation during rotation. The forks or guides can fold down into the inner tub around hinge pins as illustrated, or can be inserted into openings defined in the bottom of the tub.

A lid (FIG. 18) is provided that is mounted on hinges. The hinges in turn include magnets (e.g. disc magnets) that are embedded in the hinge and the housing to help hold the lid closed.

It will be appreciated that the unit 3100 can be provided with an electronic or mechanical controller and be provided with any of the control features as set forth above for unit 2600 above, or any of the other cooling units disclosed herein.

As will be appreciated, the embodiment can have a removable rechargeable battery pack but the battery pack is optional, and an AC adaptor can be provided that takes the place of the battery pack, as desired.

Example—BQ™ Controller

FIG. 2 illustrates inventive aspects of a BQ™ controller 601 for controlling a system such as that illustrated in FIG. 1 implementing some of the embodiments disclosed herein.

In this embodiment, the BQ™ controller 601 may serve to aggregate, process, store, search, serve, identify, instruct, generate, match, and/or facilitate interactions with a computer through various technologies, and/or other related data.

Typically, a user or users, e.g., 633a, which may be people or groups of users and/or other systems, may engage information technology systems (e.g., computers) to facilitate operation of the system and information processing. In turn, computers employ processors to process information; such processors 603 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 629 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the BQ™ controller 601 may be connected to and/or communicate with entities such as, but not limited to: one or more users from user input devices 611; peripheral devices 612, components of the thermal management device 10; an optional cryptographic processor device 628; and/or a communications network 613. For example, the BQ™ controller 601 may be connected to and/or communicate with users, e.g., 633a, operating client device(s), e.g., 633b, including, but not limited to, personal computer(s), server(s) and/or various mobile device(s) including, but not limited to, cellular telephone(s), smartphone(s) (e.g., iPhone®, Blackberry®, Android OS-based phones etc.), tablet computer(s) (e.g., Apple iPad™ HP Slate™, Motorola Xoom™, etc.), eBook reader(s) (e.g., Amazon Kindle™, Barnes and Noble's Nook™ eReader, etc.), laptop computer(s), notebook(s), netbook(s), gaming console(s) (e.g., XBOX Live™, Nintendo® DS, Sony PlayStation® Portable, etc.), portable scanner(s) and/or the like.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The BQ™ controller 601 may be based on computer systems that may comprise, but are not limited to, components such as: a computer systemization 602 connected to memory 629.

Computer Systemization

A computer systemization 602 may comprise a clock 630, central processing unit ("CPU(s)" and/or "processor(s)" (these terms are used interchangeably throughout the disclosure unless noted to the contrary)) 603, a memory 629 (e.g., a read only memory (ROM) 606, a random access memory (RAM) 605, etc.), and/or an interface bus 607, and most frequently, although not necessarily, are all interconnected and/or communicating through a system bus 604 on one or more (mother)board(s) 602 having conductive and/or otherwise transportive circuit pathways through which instructions (e.g., binary encoded signals) may travel to effect communications, operations, storage, etc. Optionally, the computer systemization may be connected to an internal power source 686; e.g., optionally the power source may be internal. Optionally, a cryptographic processor 626 and/or transceivers (e.g., ICs) 674 may be connected to the system bus. In another embodiment, the cryptographic processor and/or transceivers may be connected as either internal and/or external peripheral devices 612 via the interface bus I/O. In turn, the transceivers may be connected to antenna(s) 675, thereby effectuating wireless transmission and reception of various communication and/or sensor protocols; for example the antenna(s) may connect to: a Texas Instruments WiLink WL1283 transceiver chip (e.g., providing 802.11n, Bluetooth 3.0, FM, global positioning system (GPS) (thereby allowing BQ™ controller to determine its location)); Broadcom BCM4329FKUBG transceiver chip (e.g., providing 802.11n, Bluetooth 2.1+EDR, FM, etc.); a Broadcom BCM4750IUB8 receiver chip (e.g., GPS); an Infineon Technologies X-Gold 618-PMB9800 (e.g., providing 2G/3G HSDPA/HSUPA communications); and/or the like. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. Of course, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 629 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the BQ™ controller and beyond through various interfaces. Should processing requirements dictate a greater amount speed and/or capacity, distributed processors (e.g., Distributed BQ™ embodiments), mainframe, multi-core, parallel, and/or super-computer architectures may similarly be employed. Alternatively, should deployment requirements dictate greater portability, smaller Personal Digital Assistants (PDAs) may be employed.

Depending on the particular implementation, features of the BQ™ implementations may be achieved by implementing a microcontroller such as CAST's R8051XC2 microcontroller; Intel's MCS 51 (i.e., 8051 microcontroller); and/or the like. Also, to implement certain features of the BQ™ embodiments, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the BQ™ component collection (distributed or otherwise) and/or features may be implemented via the microprocessor and/or via embedded components; e.g., via ASIC, coprocessor, DSP, FPGA, and/or the like. Alternately, some implementations of the BQ™ may be implemented with embedded components that are configured and used to achieve a variety of features or signal processing.

Depending on the particular implementation, the embedded components may include software solutions, hardware solutions, and/or some combination of both hardware/software solutions. For example, BQ™ features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the BQ™ features. A hierarchy of programmable interconnects allow logic blocks to be interconnected as needed by the BQ™ system designer/administrator, somewhat like a one-chip programmable breadboard. An FPGA's logic blocks can be programmed to perform the function of basic logic gates such as AND, and XOR, or more complex combinational functions such as decoders or simple mathematical functions. In most FPGAs, the logic blocks also include memory elements, which may be simple flip-flops or more complete blocks of memory. In some circumstances, the BQ™ may be developed on regular FPGAs and then migrated into a fixed version that more resembles ASIC implementations. Alternate or coordinating implementations may migrate BQ™ controller features to a final ASIC instead of or in addition to FPGAs. Depending on the implementation all of the aforementioned embedded components and microprocessors may be considered the "CPU" and/or "processor" for the BQ™

Power Source

The power source 686 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 686 is connected to at least one of the interconnected subsequent components of the BQ™ thereby providing an electric current to all subsequent components. In one example, the power source 686 is connected to the system bus component 604. In an alternative embodiment, an outside power source 686 is provided through a connection across the I/O 608 interface. For example, a USB and/or IEEE 1394 connection carries both data and power across the connection and is therefore a suitable source of power.

Interface Adapters

Interface bus(ses) 607 may accept, connect, and/or communicate to a number of interface adapters, conventionally although not necessarily in the form of adapter cards, such as but not limited to: input output interfaces (I/O) 608, storage interfaces 609, network interfaces 610, and/or the like. Optionally, cryptographic processor interfaces 627 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 609 may accept, communicate, and/or connect to a number of storage devices such as, but not limited to: storage devices 614, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 610 may accept, communicate, and/or connect to a communications network 613. Through a communications network 613, the BQ™ controller is accessible through remote clients 633b (e.g., computers with web browsers) by users 633a. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed BQ™), architectures may similarly be employed to pool, load balance, and/or otherwise increase the communicative bandwidth required by the BQ™ controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 610 may be used to engage with various communications network types 613. For example, multiple network interfaces may be employed to allow for the communication over broadcast, multicast, and/or unicast networks.

Input Output interfaces (I/O) 608 may accept, communicate, and/or connect to user input devices 611, peripheral devices 612, cryptographic processor devices 628, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless transceivers: 802.11a/b/g/n/x; Bluetooth; cellular (e.g., code division multiple access (CDMA), high speed packet access (HSPA(+)), high-speed speed downlink packet access (HSDPA), global system for mobile communications (GSM), long term evolution (LTE), WiMax, etc.); and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices 611 often are a type of peripheral device 612 (see below) and may include: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like.

Peripheral devices 612, such as other components of the thermal management device system 10, including temperature sensors, ice dispensers (if provided) and the like may be connected and/or communicate to I/O and/or other facilities of the like such as network interfaces, storage interfaces, directly to the interface bus, system bus, the CPU, and/or the like. Peripheral devices may be external, internal and/or part of the BQ™ controller. Peripheral devices may also include, for example, an antenna, audio devices (e.g., line-in, line-out, microphone input, speakers, etc.), cameras (e.g., still, video, webcam, etc.), drive motors, ice maker 68, lighting, video monitors and/or the like.

Cryptographic units such as, but not limited to, microcontrollers, processors 626, interfaces 627, and/or devices 628 may be attached, and/or communicate with the BQ™ controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of CPU. Equivalent microcontrollers and/or processors may also be used. Other commercially available specialized cryptographic processors include: the Broadcom's CryptoNetX and other Security Processors; nCipher's nShield, SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+MB/s of cryptographic instructions; VLSI Technology's 33 MHz 6868; and/or the like.

Memory

Generally, any mechanization and/or embodiment allowing a processor to affect the storage and/or retrieval of information is regarded as memory 629 (or 68, 72, etc.). However, memory is a fungible technology and resource, thus, any number of memory embodiments may be employed in lieu of or in concert with one another. It is to be understood that the BQ™ controller and/or a computer systemization may employ various forms of memory 629. For example, a computer systemization may be configured wherein the functionality of on-chip CPU memory (e.g., registers), RAM, ROM, and any other storage devices are provided by a paper punch tape or paper punch card mechanism; of course such an embodiment would result in an extremely slow rate of operation. In a typical configuration, memory 629 will include ROM 606, RAM 605, and a storage device 614. A storage device 614 may be any conventional computer system storage. Storage devices may include a drum; a (fixed and/or removable) magnetic disk drive; a magneto-optical drive; an optical drive (i.e., Blu-eray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory 629 may contain a collection of program and/or database components and/or data such as, but not limited to: operating system component(s) 615 (operating system); information server component(s) 616 (information server); user interface component(s) 617 (user interface); Web browser component(s) 618 (Web browser); database(s) 619; mail server component(s) 621; mail client component(s) 622; cryptographic server component(s) 620 (cryptographic server) and/or the like (i.e., collectively a component collection). These components may be stored and accessed from the storage devices and/or from storage devices accessible through an interface bus. Although non-conventional program components such as those in the component collection, typically, are stored in a local storage device 614, they may also be loaded and/or stored in memory such as: peripheral devices, RAM, remote storage facilities through a communications network, ROM, various forms of memory, and/or the like.

Operating System

The operating system component 615 is an executable program component facilitating the operation of the BQ™ controller. Typically, the operating system facilitates access of I/O, network interfaces, peripheral devices, storage devices, and/or the like. The operating system may be a highly fault tolerant, scalable, and secure system such as: Apple Macintosh OS X (Server); AT&T Plan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/NT/Vista/XP (Server), Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the BQ™ controller to communicate with other entities through a communications network 613. Various communication protocols may be used by the BQ™ controller as a subcarrier transport mechanism for interaction, such as, but not limited to: multicast, TCP/IP, UDP, unicast, and/or the like.

Information Server

An information server component 616 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the BQ™ controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the BQ™ database 619, operating systems, other program components, user interfaces, Web browsers, and/or the like.

Access to the BQ™ database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the BQ™. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the BQ™ as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millenium/NT/XP/Vista/7 (i.e., Aero), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface, any of which may be used and) provide a baseline and means of accessing and displaying information graphically to users.

A user interface component 617 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 618 is a stored program component that is executed by a
CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Of course, in place of a Web browser and information server, a combined application may be developed to perform similar functions of both. The combined application would similarly affect the obtaining and the provision of information to users, user agents, and/or the like from the BQ™ enabled nodes. The combined application may be nugatory on systems employing standard Web browsers.

Mail Server

A mail server component 621 is a stored program component that is executed by a CPU 603. The mail server may be a conventional Internet mail server such as, but not limited to sendmail, Microsoft Exchange, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the BQ™.

Access to the BQ™ mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 622 is a stored program component that is executed by a CPU 603. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 620 is a stored program component that is executed by a CPU 603, cryptographic processor 626, cryptographic processor interface 627, cryptographic processor device 628, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash function), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the BQ™ may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for a digital audio file. A cryptographic component may communicate to and/or with other components in a component collection, including itself, and/or facilities of the like. The cryptographic component supports encryption schemes allowing for the secure transmission of information across a communications network to enable the BQ™ component to engage in secure transactions if so desired. The cryptographic component facilitates the secure accessing of resources on the BQ™ and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The BQ™ Database

The BQ™ database component 619 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the BQ™ database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of functionality encapsulated within a given object. If the BQ™ database is implemented as a data-structure, the use of the BQ™ database 619 may be integrated into another component such as the BQ™ component 635. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 619 includes several tables 619*a-n*. A Users (e.g., operators and physicians) table 619*a* may include fields such as, but not limited to: user_id, ssn, dob, first_name, last_name, age, state, address_firstline, address_secondline, zipcode, devices_list, contact_info, contact_type, alt_contact_info, alt_contact_type, and/or the like to refer to any type of enterable data or selections discussed herein. The Users table may support and/or track multiple entity accounts. A Clients table 619*b* may include fields such as, but not limited to: user_id, client_id, client_ip, client_type, client_model, operating_system, os_version, app_installed_flag, and/or the like. An Apps table 619*c* may include fields such as, but not limited to: app_ID, app_name, app_type, OS_compatibilities_list, version, timestamp, developer_ID, and/or the like. A beverages table 619*d* including, for example, heat capacities and other useful parameters of different beverages, such as depending on size beverage_name, beverage_size, desired_coolingtemp, cooling_time, favorite_drinker, number_of_beverages, current_beverage_temperature, current_ambient_temperature, and/or the like. An Parameter table 619*e* may include fields including the foregoing fields, or additional ones such as cool_start_time, cool_preset, cooling_rate, and/or the like. A Cool Routines table 619*f* may include a plurality of cooling sequences may include fields such as, but not limited to: sequence_type, sequence_id, flow_rate, avg_water_temp, cooling_time, pump_setting, pump_speed, pump_pressure, power_level, temperature_sensor_id_number, temperature_sensor_location, and/or the like.

In one embodiment, user programs may contain various user interface primitives, which may serve to update the BQ™ platform. Also, various accounts may require custom database tables depending upon the environments and the types of clients the BQ™ system may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 619a-n. The BQ™ system may be configured to keep track of various settings, inputs, and parameters via database controllers.

The BQ™ database may communicate to and/or with other components in a component collection, including itself, and/or facilities of the like. Most frequently, the BQ™ database communicates with the BQ™ component, other program components, and/or the like. The database may contain, retain, and provide information regarding other nodes and data.

The BQ™ Components

The BQ™ component 635 is a stored program component that is executed by a CPU. In one embodiment, the BQ™ component incorporates any and/or all combinations of the aspects of the BQ™ systems discussed in the previous figures. As such, the BQ™ component affects accessing, obtaining and the provision of information, services, transactions, and/or the like across various communications networks.

The BQ™ component may transform data collected by the thermal management device 10 or input signals received, e.g., from a mobile device, into commands for operating the cooler 10.

The BQ™ component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo! User Interface; and/or the like), WebObjects, and/or the like. In one embodiment, the BQ™ server employs a cryptographic server to encrypt and decrypt communications. The BQ™ component may communicate to and/or with other components in a component collection, including itself, and/or facilities of the like. Most frequently, the BQ™ component communicates with the BQ™ database, operating systems, other program components, and/or the like. The BQ™ may contain, communicate, generate, obtain, and/or provide program component, system, user, and/or data communications, requests, and/or responses.

Distributed BQ™ Embodiments

The structure and/or operation of any of the BQ™ node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the BQ™ controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c -post http://... Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the BQ™ controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

```
<?PHP
header('Content-Type: text/plain');
// set ip address and port to listen to for incoming data
$address = '192.168.0.100';
$port = 255;
// create a server-side SSL socket, listen for/accept incoming
communication
$sock = socket_create(AF_INET, SOCK_STREAM, 0);
socket_bind($sock, $address, $port) or die('Could not bind to address');
socket_listen($sock);
$client = socket_accept($sock);
// read input data from client device in 1024 byte blocks until end of
message do {
    $input = "";
    $input = socket_read($client, 1024);
    $data .= $input;
} while($input ! = "");
// parse data to extract variables
$obj = json_decode($data, true);
// store input data in a database
mysql_connect("201.408.185.132",$DBserver,$password); // access
database server
mysql_select("CLIENT_DB.SQL"); // select database to append
mysql_query("INSERT INTO UserTable (transmission)
VALUES ($data)"); // add data to UserTable table in a CLIENT database
mysql_close("CLIENT_DB.SQL"); // close connection to database
?>
```

Also, the following resources may be used to provide example embodiments regarding SOAP parser implementation:

http://www.xav.com/perl/site/lib/SOAP/Parser.html
http://publib.boulder.ibm.com/infocenter/tivihelp/v2r1/index.jsp?topic=/com.ibm.IBMDI.doc/referenceguide295.htm and other parser implementations:

http://publib.boulder.ibm.com/infocenter/tivihelp/v2r1/index.jsp?topic=/com.ibm.IBMDI.doc/referenceguide259.htm all of which are hereby expressly incorporated by reference.

In order to address various issues and advance the art, the entirety of this application (including the Cover Page, Title, Headings, Field, Background, Summary, Brief Description of the Drawings, Detailed Description, Claims, Abstract, Figures, Appendices and/or otherwise) shows by way of illustration various embodiments in which the claimed inventions may be practiced. The advantages and features of the application are of a representative sample of embodiments only, and are not exhaustive and/or exclusive. They are presented only to assist in understanding and teach the claimed principles. It should be understood that they are not representative of all disclosed embodiments. As such, certain aspects of the disclosure have not been discussed herein. That alternate embodiments may not have been presented for a specific portion of the invention or that further undescribed alternate embodiments may be available for a portion is not to be considered a disclaimer of those alternate embodiments. It will be appreciated that many of those undescribed embodiments incorporate the same principles of the invention and others are equivalent. Thus, it is to be understood that other embodiments may be utilized and functional, logical, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the invention, and inapplicable to others. In addition, the disclosure includes other inventions not presently claimed. Applicant reserves all rights in those presently unclaimed inventions including the right to claim such inventions, file additional applications, continuations, continuations in part, divisions, and/or the like thereof. As such, it should be understood that advantages, embodiments, examples, functional, features, logical, organizational, structural, topological, and/or other aspects of the disclosure are not to be considered limitations on the disclosure as defined by the claims or limitations on equivalents to the claims. It is to be understood that, depending on the particular needs and/or characteristics of a BQ™ individual and/or enterprise user, database configuration and/or relational model, data type, data transmission and/or network framework, syntax structure, and/or the like, various embodiments of the BQ™ may be implemented that enable a great deal of flexibility and customization.

All statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Descriptions herein of circuitry and method steps and computer programs represent conceptual embodiments of illustrative circuitry and software embodying the principles of the disclosed embodiments. Thus the functions of the various elements shown and described herein may be provided through the use of dedicated hardware as well as hardware capable of executing software in association with appropriate software as set forth herein.

Terms to exemplify orientation, such as upper/lower, left/right, top/bottom and above/below, may be used herein to refer to relative positions of elements as shown in the figures. It should be understood that the terminology is used for notational convenience only and that in actual use the disclosed structures may be oriented different from the orientation shown in the figures. Thus, the terms should not be construed in a limiting manner.

In the disclosure hereof any element expressed as a means for performing a specified function is intended to encompass any way of performing that function including, for example, a) a combination of circuit elements and associated hardware which perform that function or b) software in any form, including, therefore, firmware, microcode or the like as set forth herein, combined with appropriate circuitry for executing that software to perform the function. Applicants thus regard any means which can provide those functionalities as equivalent to those shown herein.

Similarly, it will be appreciated that the system and process flows described herein represent various processes which may be substantially represented in computer-readable media and so executed by a computer or processor, whether or not such computer or processor is explicitly shown. Moreover, the various processes can be understood as representing not only processing and/or other functions but, alternatively, as blocks of program code that carry out such processing or functions.

As examples, the Specification describes and/or illustrates aspects useful for implementing the claimed disclosure by way of various circuits or circuitry which may be illustrated as or using terms such as blocks, modules, device, system, unit, controller, and/or other circuit-type depictions. Such circuits or circuitry are used together with other elements to exemplify how certain embodiments may be carried out in the form or structures, steps, functions, operations, activities, etc. In certain embodiments, such illustrated items represent one or more computer circuitry (e.g., microcomputer or other CPU) which is understood to include memory circuitry that stores code (program to be executed as a set/sets of instructions) for performing an algorithm. The specification may also make reference to an adjective that does not connote any attribute of the structure ("first [type of structure]" and "second [type of structure]") in which case the adjective is merely used for English-language antecedence to differentiate one such similarly-named structure from another similarly-named structure (e.g., "first circuit configured to convert . . . " is interpreted as "circuit configured to convert . . . "). On the other hand, specification may make reference to an adjective that is intended to connote an attribute of the structure (e.g., monitor server), in which case the adjective (e.g., monitor) modifies to refer to at least a portion of the named structure (e.g., server) is configured to have/perform that attribute (e.g., monitor server refers to at least a portion of a server that includes/performs the attribute of monitoring.

The methods, systems, computer programs and mobile devices of the present disclosure, as described above and shown in the drawings, among other things, provide for improved beverage cooling methods, systems and machine readable programs for carrying out the same. It will be apparent to those skilled in the art that various modifications and variations can be made in the devices, methods, software programs and mobile devices of the present disclosure without departing from the spirit or scope of the disclosure. Thus, it is intended that the present disclosure include modifications and variations that are within the scope of the subject disclosure and equivalents.

What is claimed is:

1. A modular retrofit device for adjusting the temperature of at least one beverage container, comprising:
   a main body portion adapted and configured to be removably positioned at least partially within a container having a liquid bath, the main body portion including at least one space configured for holding at least one beverage container;
   at least one adjustable leg configured and arranged to selectively be adjusted downwardly to situate the height of the main body portion with respect to the container having the liquid bath;
   a pump coupled to and removable with the main body portion; and
   a conduit coupled so as to be in fluid communication with the main body portion;
   wherein activation of the pump is operative to draw liquid from the liquid bath into the main body portion and direct the liquid over the at least one beverage container disposed in the at least one space defined in the main body portion.

2. The device of claim 1, wherein the device includes at least one deployable guide for restraining motion of a neck of a container residing within the at least one space defined in the main body portion.

3. The device of claim 1, further comprising a hinged lid configured to be held closed by magnets.

4. The device of claim 1, wherein the pump is at least partially housed in said at least one adjustable leg.

5. The device of claim 1, wherein the at least one adjustable leg includes a first adjustable leg located proximate a first side of the main body portion, and a second adjustable leg proximate a second side of the main body portion.

6. The device of claim 5, wherein the first adjustable leg and the second adjustable leg each have a width that corresponds to a width of the first side of the main body portion and the second side of the main body portion respectively.

7. The device of claim 5, wherein each of the first adjustable leg and the second adjustable leg are configured to slide in a respective track.

8. The device of claim 7, wherein each of the first adjustable leg and the second adjustable leg are configured to lock in a plurality of different positions to form a plurality of different effective lengths.

9. The device of claim 7, further comprising at least one guide fork disposed within the main body portion to maintain a horizontally oriented bottle in a predetermined orientation during rotation and cooling.

10. The device of claim 9, wherein the at least one guide fork is deployable from a first position to a second position wherein the at least one guide fork can at least partially surround a neck portion of a horizontally oriented bottle.

11. The device of claim 10, wherein the at least one guide fork is configured to pivot about at least one hinge pin from the first position to the second position.

12. The device of claim 1, wherein the main body portion is defined by an outer housing having an open top side, the open top side being configured to receive an internal tub component, wherein the internal tub component is configured to receive at least one beverage container.

13. The device of claim 12, wherein the internal tub component includes a drive train to rotate at least one horizontally oriented shaft to cause rotation of a beverage container disposed in the internal tub during a cooling or heating process.

14. The device of claim 13, wherein the drive train is adapted and configured to rotate a plurality of horizontally oriented shafts to cause rotation of a container disposed in the internal tub during a cooling or heating process.

15. The device of claim 1, further comprising a receptacle defined in the main body portion for receiving a power source.

16. The device of claim 15, further comprising a removable rechargeable battery disposed in the receptacle to power the device.

17. The device of claim 15, further comprising an AC adapter disposed in the receptacle to power the device.

18. The device of claim 1, further comprising a lid hingedly coupled to the main body portion of the device.

19. The device of claim 18, further comprising a magnetic closure to hold the lid in a closed condition.

20. The device of claim 1, further comprising a drive to rotate containers of different shapes and sizes simultaneously while adjusting the temperature of the contents of the containers.

* * * * *